US010460394B2

(12) United States Patent
Perl et al.

(10) Patent No.: US 10,460,394 B2
(45) Date of Patent: Oct. 29, 2019

(54) AUTONOMOUS OR PARTIALLY AUTONOMOUS MOTOR VEHICLES WITH AUTOMATED RISK-CONTROLLED SYSTEMS AND CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Donato Genovese, Zurich (CH); Andrea Keller, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 458 days.

(21) Appl. No.: 15/295,522

(22) Filed: Oct. 17, 2016

(65) Prior Publication Data
US 2017/0372431 A1 Dec. 28, 2017

Related U.S. Application Data

(63) Continuation of application No. PCT/EP2016/064758, filed on Jun. 24, 2016.

(51) Int. Cl.
*G06Q 40/08* (2012.01)
*G06Q 20/10* (2012.01)
*G07C 5/00* (2006.01)
*G07C 5/08* (2006.01)
*G08G 1/01* (2006.01)

(52) U.S. Cl.
CPC ............. *G06Q 40/08* (2013.01); *G06Q 20/10* (2013.01); *G07C 5/008* (2013.01); *G07C 5/085* (2013.01); *G08G 1/0112* (2013.01)

(58) Field of Classification Search
CPC .............................. G06Q 40/08; G06Q 20/10
See application file for complete search history.

(56) References Cited

U.S. PATENT DOCUMENTS 8,595,034 B2 * 11/2013 Bauer .................... G06Q 40/02
434/322
9,754,490 B2 * 9/2017 Kentley ............. G06K 9/00805
(Continued)

*Primary Examiner* — Narayanswamy Subramanian
(74) *Attorney, Agent, or Firm* — Oblon, McClelland, Maier & Neustadt, L.L.P.

(57) ABSTRACT

Aspects of the disclosure include a first risk-transfer system, a second risk-transfer system, and an expert-system based circuit. The first risk-transfer system is configured to provide a first risk-transfer based on first risk-transfer parameters from a plurality of motor vehicles to the first risk-transfer system, and receive and store first payment parameters associated with risk exposures of the plurality of motor vehicles. The second risk-transfer system is configured to provide a second risk-transfer based on second risk-transfer parameters from the first risk-transfer system to the second risk-transfer system, and receive and store second payment parameters associated with risk exposures transferred to the first risk-transfer systems. The expert-system based circuit is configured to receive environmental parameters and operating parameters from the plurality of motor vehicles, adjust the first risk transfer parameters and correlated first payment transfer parameters, and adjust the second risk transfer parameters and correlated second payment transfer parameters.

51 Claims, 10 Drawing Sheets

(56) References Cited

U.S. PATENT DOCUMENTS

| | | | |
|---|---|---|---|
| 10,049,408 B2* | 8/2018 | Carver | G06Q 40/08 |
| 10,065,647 B2* | 9/2018 | Tiwari | G08G 1/0112 |
| 10,162,357 B2* | 12/2018 | Michalakis | G08G 1/096791 |
| 10,209,718 B2* | 2/2019 | Tiwari | G05D 1/0246 |
| 2017/0123422 A1* | 5/2017 | Kentley | B60H 1/00735 |
| 2017/0234689 A1* | 8/2017 | Gibson | G01C 21/3492 |
| | | | 701/25 |
| 2017/0372431 A1* | 12/2017 | Perl | G06Q 20/10 |
| 2018/0025430 A1* | 1/2018 | Perl | B60R 16/0231 |
| | | | 705/4 |
| 2018/0047107 A1* | 2/2018 | Perl | G06N 5/02 |
| 2018/0075380 A1* | 3/2018 | Perl | G06Q 10/0635 |
| 2018/0300816 A1* | 10/2018 | Perl | G06Q 50/01 |
| 2019/0005588 A1* | 1/2019 | Carver | G06Q 40/08 |
| 2019/0102840 A1* | 4/2019 | Perl | G06N 3/08 |

\* cited by examiner

Fig. 1

| Level 1 | Level 2 | Level 3 | Level 4 |
|---|---|---|---|
| Function-specific Automation | Combined Function Automation | Limited Self-Driving Automation | Full Self-Driving Automation |
| Automation at this level involves one or more specific control functions; if multiple functions are automated, they operate independently from each other. The driver has overall control, and is solely responsible for safe operation, but can choose to cede limited authority over a primary control (as in adaptive cruise control), the vehicle can automatically assume limited authority over a primary control (as in electronic stability control), or the automated system can provide added control to aid the driver in certain normal driving or crash-imminent situations (e.g., dynamic brake support in emergencies). The vehicle may have multiple capabilities combining individual driver support and crash avoidance technologies, but does not replace driver vigilance and does not assume driving responsibility from the driver. The vehicle's automated system may assist or augment the driver in operating one of the primary controls – either steering or braking/throttle controls (but not both). As a result, there is no combination of vehicle control systems working in unison that enables the driver to be disengaged from physically operating the vehicle by having his or her hands off the steering wheel AND feet off the pedals at the same time. Examples of function-specific automation systems include: cruise control, automatic braking, and lane keeping. | This level involves automation of at least two primary control functions designed to work in unison to relieve the driver of control of those functions. Vehicles at this level of automation can utilize shared authority when the driver cedes active primary control in certain limited driving situations. The driver is still responsible for monitoring the roadway and safe operation and is expected to be available for control at all times and on short notice. The system can relinquish control with no advance warning and the driver must be ready to control the vehicle safely. An example of combined functions enabling a Level 2 system is adaptive cruise control in combination with lane centering. The major distinction between level 1 and level 2 is that, at level 2 in the specific operating conditions for which the system is designed, an automated operating mode is enabled such that the driver is disengaged from physically operating the vehicle by having his or her hands off the steering wheel AND foot off pedal at the same time. | Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The vehicle is designed to ensure safe operation during the automated driving mode. An example would be an automated or self-driving car that can determine when the system is no longer able to support automation, such as from an oncoming construction area, and then signals to the driver to reengage in the driving task, providing the driver with an appropriate amount of transition time to safely regain manual control. The major distinction between level 2 and level 3 is that at level 3, the vehicle is designed so that the driver is not expected to constantly monitor the roadway while driving. | The vehicle is designed to perform all safety-critical driving functions and monitor roadway conditions for an entire trip. Such a design anticipates that the driver1 will provide destination or navigation input, but is not expected to be available for control at any time during the trip. This includes both occupied and unoccupied vehicles. By design, safe operation rests solely on the automated vehicle system. |

AUTONOMOUS OR PARTIALLY AUTONOMOUS MOTOR VEHICLES WITH AUTOMATED RISK-CONTROLLED SYSTEMS AND CORRESPONDING METHOD THEREOF

CROSS-REFERENCE TO RELATED APPLICATIONS

This application is a continuation of International Application No. PCT/EP2016/064758 filed on Jun. 24, 2016; the entire contents of which are incorporated herein by reference.

FIELD OF THE INVENTION

The present invention relates to autonomous vehicle driving, in particular to automated system for automated data capturing, operational data generation, risk assessment, and risk prediction in the field of autonomous vehicle driving or Advanced Driver Assistance Systems (ADAS) systems, which technically support the driver in the driving process. More particular, the system of the present invention automotive or automotive engineered motor vehicles, as for example cars. Typically, they comprise a safe Human-Machine Interface (HMI), and increase car safety and more generally road safety. Autonomous vehicle driving systems may allow to partially automate or completely automate car driving, and autonomous vehicles may operate with little or no input from a human. However, also autonomous vehicle driving systems and vehicles with ADAS systems are exposed to risks, while driving from one point to another point. The present invention is further directed to risk assessment in the context of such autonomous vehicle driving systems and/or vehicles with ADAS system supported driving facilities, with telematics based automated risk-transfer, alert and real-time notification systems for motor vehicles and wireless technology used in the context of telematics. Especially, the invention relates to machine-learning based automotive car systems. The term telematics, in particular traffic telematics, refers to systems that are used for communications, instrumentation and control, and information technology in the field of transportation. More particular, the present invention relates to the use of telematics together with real-time risk-monitoring, automated risk-transfer and insurance systems based on captured and measured usage-based and/or user-based automotive data, in particular to systems enabled to trigger, signal, and mutually activate coupled first and second insurance system (risk-transfer tiers) providing a self-sufficient, automated risk protection for a variable number of risk exposed motor vehicles.

BACKGROUND OF THE INVENTION

Automotive engineering is a relatively new technological field, especially for car driving. Autonomous car driving (also so called driverless car, self-driving car, robotic car) is associated with vehicles that are capable of sensing its environment and navigating without human input. Autonomous vehicles are capable of detecting surroundings using radar, LIDAR (measuring device to measure distances by means of laser light), GPS (Global Positioning System), odometry (measuring device for measuring changings in position over time by means of using motion sensor data), and computer vision. In autonomous cars, advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. Early trials for autonomous car driving systems date back to the 1920s and 30s. However, the first self-sufficient (i.e., truly autonomous) cars appeared in the 1980s, with Carnegie Mellon University's Navlab and ALV projects in 1984 and Mercedes-Benz and Bundeswehr University Munich's Eureka Prometheus Project in 1987. Since then, numerous major companies and research organizations have developed working prototype autonomous vehicles. Recently, Tesla Motors has pushed driverless car technology with its autopilot system. Most previous systems required the driver to maintain hands on the steering wheel whereas Tesla allows for periods of time without. Another upcoming system is Cadillac's super cruise that will not require the driver to maintain hands on the wheel. An overview of the development is given by FIG. 1.

Apart from autonomous car driving, automotive engineering is, in fact, more common for aerospace engineering and marine engineering, than for vehicle engineering. Though, automotive engineering comprises similar technical means in the different fields, it does not completely overlap. Automotive car engineering comprises elements of mechanical, electrical, electronic, software and safety engineering as applied to the design, manufacture and operation of motorcycles, automobiles and trucks and their respective engineering subsystems. One important aspect of automotive engineering is related to safety engineering: Safety engineering is the assessment of various crash scenarios and their impact on the vehicle occupants. These are tested against very stringent regulatory or governmental regulations. Some of these requirements include: seat belt and air bag functionality testing, front and side impact testing, and tests of rollover resistance. Assessments are done with various methods and tools, including computer crash simulation (typically finite element analysis), crash test dummies, and partial system sled and full vehicle crashes. Other important aspects of automotive engineering relate, for example, to (i) fuel economy/emissions optimization systems, (ii) vehicle dynamics optimization (vehicle dynamics is the vehicle's response of attributes as e.g. ride, handling, steering, braking, comfort and traction), (iii) NVH (noise, vibration, and harshness) engineering (i.e. the customer's feedback systems both tactile (felt) and audible (heard)) from the vehicle, (iv) vehicle electronics engineering, in particular automotive electronics engineering, which systems are responsible for operational controls such as the throttle, brake and steering controls; as well as comfort and convenience systems such as the HVAC (heating, ventilating, and air conditioning) systems, infotainment systems, and lighting systems. Automotive systems with modern safety and fuel economy requirements are not possible without electronic controls, (v) performance control system (e.g. how quickly a car can accelerate (e.g. standing start 100 m elapsed time, 0-100 km/h, etc.), top speed, how short and quickly a car can come to a complete stop from a set speed (e.g. 50-0 km/h), how much g-force a car can generate without losing grip, recorded lap times, cornering speed, brake fade, or the amount of control in inclement weather (snow, ice, rain)), (vi) shift quality systems (driveline, suspension, engine and power-train mounts, etc.), (vii) durability and corrosion engineering including controls under mileage accumulation, severe driving conditions, and corrosive salt baths etc., (viii) package/ergonomics engineering, as occupant's access to the steering wheel, pedals, and other driver/passenger controls, (ix) climate control, as windshield defrosting or heating and cooling capacity, (x) Drivability engineering as e.g. the vehicle's response to general driving conditions, e.g. cold starts and stalls, RPM (revolutions per minute) dips, idle response, launch hesitations and stumbles, and performance levels etc., (xi) quality control engineering, as e.g. systems to minimize risks related to product failures and liability claims of automotive electric and electronic systems etc. Finally, an important aspect of autonomous vehicle driving typically relates to modern telematics means and systems. In electronic, telecommunication and insurance industry, the technology is adopting similar and consistent technical strategies to improve the effectiveness of interactions with mobile systems and devices, but also with the customer or user of those systems, which today increasingly is a pure technology component. Further, social networking, telematics, service-oriented architectures (SOA) and usage-based services (UBS) are all in interacting and pushing this development. Social platforms, as e.g. Facebook, Twitter and YouTube, offer the ability to improve customer interactions and communicate product information. However, the field of telematics is larger still, as it introduces entirely new possibilities that align the technical input requirements and problem specifications of dynamic risk-transfer, technology and mobility. SOA and telematics is becoming key to managing the complexity of integrating known technologies and new applications.

As mentioned above, autonomous vehicle electronics engineering, which systems are responsible for operational controls of the vehicle such as the throttle, brake controls, steering controls, and lighting systems, is one of the key technologies in automotive car driven. Automotive systems with modern steering, safety and fuel economy requirements are not possible without appropriate electronic controls. Typically, the use of telematics means constitutes a central part of the autonomous vehicle electronics engineering. Telematics, in the context of autonomous car driving, comprises telecommunications, vehicular technologies, road transportation, road safety, electrical engineering (sensors, instrumentation, wireless communications, etc.), and information technology (multimedia, Internet, etc.). Thus, also the technical field of telematics are affected by a wide range of technologies as the technology of sending, receiving and storing information via telecommunication devices in conjunction with affecting control on remote objects, the integrated use of telecommunications and informatics for application in vehicles and e.g. with control of vehicles on the move, GNSS (Global Navigation Satellite System) technology integrated with computers and mobile communications technology in automotive navigation systems. The use of such technology together with road vehicles is also called vehicle telematics. In particular, telematics triggers the integration of mobile communications, vehicle monitoring systems and location technology by allowing a new way of capturing and monitoring real-time data. Usage-based risk-transfer systems, as e.g. provided by the so called Snapshot technology of the firm Progressive, links risk-transfer compensation or premiums to monitored driving behavior and usage information gathered by an in-car telematics device. In relation to automotive car systems, telematics typically further comprises installing or embedding telecommunications devices mostly in mobile units, as e.g. cars or other vehicles, to transmit real-time driving data, which for example can be used by third parties' system, as automated risk-monitoring and risk-transfer systems, providing the needed input e.g. to measure the quality and risks, to which the vehicle is exposed to. Various telematics instruments are available in the market, as e.g. vehicle tracking and global positioning satellite system (GPS) technologies or telecommunications devices that allow to be connected from almost anywhere. In particular, dynamically monitored and adapted risk-transfer could be imaginable by interconnecting telematics of the autonomous car driving system with other real-time measuring systems. After getting involved into a car accident, emergency and road services could be automatically activated, vehicle damage assessed, and the nearest repair shop contacted. In summary, the traditional operability of risk-transfer systems and insurance coverage could be transformed to real-time navigation and monitoring, including the automated activation of concierge service, safe driving tips, video-on-demand for the kids in the backseat, in-car or online feedback, and real-time vehicle diagnostics.

In addition to real-time surveillance, it is to be mentioned, that an insurance agent may want to exchange information with a customer associated with insurer for a number of different reasons. However, the information exchange between the customer and the insurer and/or the insurer and the reinsurer mostly is still cumbersome and time-consuming, and thus, risk-transfers provided by such structures typically remain static within a fixed time period agreed upon. For example, an existing or potential consumer may access an insurance agent's web page to determine a yearly or monthly cost of an insurance policy (e.g. hoping to save money or increase a level of protection by selecting a new insurance company). The consumer may provide basic information to the insurance agent (e.g. name, a type of business, date of birth, occupation, etc.), and the insurance agent may use this information to request a premium quote from the insurer. In some cases, the insurer will simply respond to the insurance agent with a premium quote. In other cases, however, an underwriter associated with insurer will ask the insurance agent to provide additional information so that an appropriate premium quote can be generated. For example, an underwriter might ask the insurance agent to indicate how often, where and to which time a motor vehicle is mainly used or other data as age of the motor vehicle and indented use (transportation etc.). Only after such additional information is determined, an appropriate risk analysis can be performed by the insurer to process adapted underwriting decision, and/or premium pricing.

Autonomous car driving with integrated telematics may offer new technological fields, in particular in monitoring and steering by means of centralized expert systems, as e.g. in the risk-transfer technology far more accurate and profitable pricing models provided by such automated expert systems. This would create a huge advantage, in particular for real-time and/or usage-based and/or dynamically operated systems. The advantage of such autonomous car driving systems is not restricted to risk transfer rather as also advantages e.g. in fleets' management that reduce fuel consumption and improve safety etc. etc. Other fields may also benefit from such autonomous car driving systems, as state and local governments needs striving to improve fuel consumption, emissions and highway safety. Some states, for example, recently issued dynamic pay-as-you-drive (PAYD) regulations, which on the other side allows insurers to offer drivers insurance rates based on actual versus estimated miles driven. It's a financial incentive to drive less.

SUMMARY OF THE INVENTION

It is one object of the present invention to provide a dynamically triggered, automated automotive car system and method, in particular an expert-system and/or machine-learning based automotive car system, based on real-time capturing of automotive data by means of distributed data transmission devices on autonomous or partially autonomous driving motor vehicles. The automated system for autonomous driving motor vehicles should be able to capture and monitor the risk associated risk events of a variable number of risk exposed motor vehicles by providing dynamic, self-sufficient risk protection for the autonomous or partially autonomous driving motor vehicles; In particular, it is an object of the present invention to extend the existing technology to a dynamic triggered and adjusted, multi-tier risk-transfer system based on a dynamic adaptable loss-ratio structure at the first-tier level (insurance), and/or a dynamically floating second-tier recoverable (reinsurance), thereby reinforcing the importance of developing automated systems allowing self-sufficient, real-time reacting operation; more particularly, it is an object to provide an automated trigger mechanism and appropriate device between the two coupled risk-transfer systems offering a measurable optimization of the systems. Another object of the invention seeks to provide a way to technically capture, handle and automate dynamically adaptable, complex risk transfer structures and trigger operations that are related to automate optimally shared risks and transfer operations. Another object of the invention seeks to dynamically synchronize and adjust such operations to changing environmental or operational conditions by means of automotive data invasive, harmonized use of telematics between the different tiers based on an appropriate technical multilayered trigger structure approach. In contrast to standard practice, the resource pooling systems of the different risk-transfer tiers shall create a reproducible and optimized operation with the desired, technically based, repetitious accuracy that relies on technical means, process flow and process control/operation. Finally, one of the objects of the present invention addresses the technical problem of coupling two automated risk-transfer systems with the goal of pooling the risk exposure of associated components and seeking better and more effective technical implementations, thereby enabling to share and minimize the needed automotive resources and to provide a unified, optimized multi-tier risk-transfer approach by sharing expert and development means for generating minimized conditions for the necessarily required resource-pooling (e.g. pooled premiums). Along the automated insurance automotive value chain, there are many technologies offering individual elements, however, it is an object of the present invention to provide a holistic technical solution that covers the whole range from device installation to the automated and accurate risk measuring, analysis and management. Finally, it is a further object of the invention to provide a dynamic, expert-system or machine learning-based, intelligent scoring system based on real-time scoring and measurements, and further to provide a technically scalable solution based on scoring algorithms and data processing allowing to adapt the signaling to other field of automated risk-transfer. As a holistic solution, the system should be able to cover the whole range from collecting sensor data, ADAS data (advanced driver assistance systems systems, or active safety) and/or AV data to accurate, reproducible and self-adaptable risk prediction, classification and/or analysis for automated risk-transfer solutions/coverage and value added services (e.g., car sharing solutions, fleet management, alerts, cross-selling, consultancy). Such autonomous operatable systems are missing in the prior art technology. The system should be able to provide an automated motor or product liability risk-transfer system related to or depending on partially or fully automated vehicles. In particular, the extent to which a vehicle is automated and/or the extent to which the automated features are activated (e.g. level of automation according to predefined definitions and categorizations (e.g. regulatory requirements as given by level 1 to 4 by NHTSA (US National Highway Traffic Safety Administration)). Finally, the system should be capable of providing an automated risk-transfer structure for diverging coverages to risk-exposed autonomous or partially autonomous driving motor vehicles, as e.g., product liability for car and/or technology manufacturer, driver liability cover, which is not possible with the prior art systems.

According to the present invention, these objects are achieved, particularly, with the features of the independent claims. In addition, further advantageous embodiments can be derived from the dependent claims and the related descriptions.

According to the present invention, the above-mentioned objects for a dynamic triggered, multi-tier risk-transfer system based on an automatically steered, automotive car or motor vehicle system for a plurality of autonomous or partially autonomous driving driving motor vehicles, in particular an expert-system based based automotive car system, are achieved, particularly, in that, by means of the present invention, an automotive car system is associated with a plurality of autonomous or partially autonomous driving driving motor vehicles, the autonomous or partially autonomous driving motor vehicles comprising exteroceptive sensors or measuring devices for sensing environmental parameters at least comprising distances to objects and/or intensity of the ambient light and/or sound amplitude, and proprioceptive sensors or measuring devices for sensing operating parameters of the motor vehicles comprising at least motor speed and/or wheel load and/or heading and/or battery status of the motor vehicles, the autonomous or partially autonomous driving motor vehicles comprising an automotive control system for autonomous or partially autonomous driving driving of the motor vehicles by interpreting the sensory data of the exteroceptive and proprioceptive sensors or measuring devices identifying appropriate navigation paths and/or obstacles and/or relevant signage, and the autonomous or partially autonomous driving motor vehicles comprising telematics devices with one or more wireless connections or wired connections between the automotive control system and an external system, and with a plurality of interfaces for connection with at least one of a vehicle's data transmission bus, and/or a plurality of interfaces for connection with the exteroceptive and proprioceptive sensors and/or measuring devices, in that the autonomous or partially autonomous driving motor vehicles or the automotive control systems) are connected to a central, expert-system based circuit by means of the mobile telematics devices, wherein an uni- or bidirectional data link is set by means of the wireless connection between the central, expert-system based circuit and the autonomous or partially autonomous driving motor vehicles transmitting at least usage-based and/or user-based and/or operating autonomous data via the mobile telematics devices to the central, expert-system based circuit, and wherein the usage-based and/or user-based and/or operational automotive data are based on the sensory data of the exteroceptive and proprioceptive sensors or measuring devices and/or operating parameters of the automotive control system, in that the automotive car system comprises one or more first risk-transfer systems to provide a first risk-transfer based on first risk transfer parameters from at least some of the motor vehicles to the first risk-transfer system, wherein the first risk-transfer system comprises a plurality of payment transfer modules configured to receive and store first payment parameters associated with risk-transfer of risk exposures of said autonomous or partially autonomous driving motor vehicles for pooling of their risks, in that by means of the central, expert-system based circuit of the automotive car system risk-related automotive data captured from the autonomous or partially autonomous driving motor vehicles are processed, wherein first risk transfer parameters and correlated first payment transfer parameters are generated by means of the central, expert-system based circuit and transmitted to the first risk-transfer system, and wherein, in the case of triggering the occurrence of one of defined risk events associated with transferred risk exposure of the the motor vehicles, the occurred loss is automatically covered by the first risk-transfer system based on the first risk transfer parameters and correlated first payment transfer parameters, in that the automotive car system comprises a second risk-transfer system to provide a second risk-transfer based on second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, in that second risk transfer parameters and correlated second payment transfer parameters are generated by means of the central, expert-system based circuit and transmitted to the second risk-transfer system, wherein the occurred loss is at least partly covered by the second insurance system based on the second risk transfer parameters and correlated second payment transfer parameters, and in that the first and second risk transfer parameters and the correlated first and second payment transfer parameters are dynamically adapted and/or optimized by means of the central, expert-system based circuit based on the usage-based and/or user-based and/or operational automotive data captured from the plurality of autonomous or partially autonomous driving motor vehicles and based on the pooled risks of the first risk transfer systems. The defined risk events associated with transferred risk exposure of the the motor vehicles can, for example, at least comprise transferred risk exposure related to liability risk-transfers for damages and/or losses and/or delay in delivery, wherein the occurred loss is automatically covered by the first risk-transfer system based on the first risk transfer parameters and correlated first payment transfer parameters (if a requested risk-transfer is not rejected by the system at this time). The exteroceptive sensors or measuring devices can, for example, comprise at least radar devices for monitoring surrounding of the motor vehicle and/or lidar devices for monitoring surrounding of the motor vehicle and/or global positioning systems or vehicle tracking devices for measuring positioning parameters of the motor vehicle and/or odometrical devices for complementing and improving the positioning parameters measured by the global positioning systems or vehicle tracking devices and/or computer vision devices or video cameras for monitoring the surrounding of the motor vehicle and/or ultrasonic sensors for measuring the position of objects close to the motor vehicle. For providing the wireless connection, the telematics device can e.g. act as wireless node within a corresponding data transmission network by means of antenna connections of the telematics device, in particular mobile telecommunication networks as e.g. 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The autonomous control systems of the motor vehicle for autonomous or partially autonomous driving motor vehicle driving can e.g. be connected to an on-board diagnostic system and/or an in-car interactive device and/or a monitoring cellular mobile node application, wherein the autonomous control systems capture usage-based and/or user-based automotive data of the motor vehicle and/or user. The telematics devices can e.g. provide the one or more wireless connections by means radio data systems (RDS) modules and/or positioning system including a satellite receiving module and/or a mobile telephone including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit. the plurality of interfaces for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices, or also OEM (Original Equipment Manufacturer) installed systems getting information access to on-board sensors or entertainment systems (as e.g. Apple Carplay etc.) providing the necessary vehicle sensor information. The expert-system based or machine-learning based autonomous control circuit can further comprise an aggregation module providing the risk exposure for one or a plurality of the pooled risk exposed motor vehicles based on the captured risk-related automotive data, wherein the first and second risk transfer parameters and the correlated first and second payment transfer parameters are dynamically generated based on the likelihood of the occurrence of the predefined risk events of the pooled autonomous or partially autonomous driving driving motor vehicles. In addition, the occurred and triggered losses can be automatically aggregated by means of captured loss parameters of the measured occurrence of risk events over all risk exposed autonomous or partially autonomous driving motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters dynamically are generated based upon the ratio of the aggregated loss parameter and the aggregated payment parameter. The first and second risk-transfer system can e.g. be fully automated steered, triggered, signaled, and mutually activated by means of the expert-system based automotive car system, wherein the steering, triggering, signaling and activating is based on the dynamic-adaptable first and second risk transfer parameters and the correlated first and second payment transfer parameters, providing a self-sufficient risk protection for the variable number of motor vehicles associated with the mobile telematics devices by means of the coupled first and second insurance system. In the context of the first- and second risk-transfer tier, the first risk-transfer system can e.g. comprise an automated first resource pooling system and the second risk-transfer system comprises a automated second resource pooling system, wherein the risk exposed autonomous or partially autonomous driving driving motor vehicles are connected to the first resource pooling system by means of a plurality of payment transfer modules configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer modules configured to receive and store second payment parameters from the first insurance system for adopting of a portion of the risk exposures accumulated by the first risk-transfer system, and wherein, in the case of the occurrence of one of defined risk events the occurred loss is automatically covered by the expert-system based automotive car system. One of the advantages of the present system is to provide a technical solution of coupling two automated risk-transfer systems with a better and more effective technical implementations, thereby enabling to share and minimize the needed automotive resources and to provide a unified, optimized multi-tier risk-transfer approach by sharing expert and development means for generating minimized conditions for the necessarily required resource-pooling (e.g. pooled premiums). The present invention provides a holistic technical solution that covers the whole range risk-transfer structures from collecting sensor and ADAS (advanced driver assistance systems systems, or active safety) and AV (autonomous vehicle) data to accurate risk analysis for automated risk-transfer systems/coverage and value added services (e.g., car sharing solutions, fleet management, alerts, cross-selling, consultancy), which is not possible with the prior art systems. The present invention provides an automated risk-transfer system for all kinds of risk-transfer schemes, as e.g. motor or product liability (re-)insurance systems and/or risk-transfer systems related to or depending on partially or fully automated vehicles. Especially the extent to which a vehicle is automated and/or the extent to which the automated features are activated (e.g. level of automation, e.g. according to predefined definitions and categorizations, as e.g. given by the levels 1 to 4 of the NHTSA (US National Highway Traffic Safety Administration)). Also, the present invention provides a holistic and unified, automated technical approach for coverage to the autonomous or partially autonomous driving motor vehicles in all different structures of risk-transfer, as e.g. product liability for car and/or technology manufacturer, driver liability cover. Further, the present invention also provides a holistic technical solution that covers the whole range from automotive control circuits and/or telematics devices and/or app installations to the automated and accurate risk measuring, analysis and management. Finally, it is able to provide a dynamic, expert-system based or machine learning-based scoring system based on real-time scoring and measurements, and further provides a technically scalable solution based on scoring algorithms and data processing allowing to adapt the signaling to other fields of automated risk-transfer. The present invention with the expert-system based system, which is enhanced by contextual data, is able to provide best and highest optimized technical solution to the real-time adapted multi-tier risk-transfer system. It allows to capture and control the driver score behavior, and compare its behavior within the technical operation and context. It allows to automatically capture risk's scores according to location or trip, and to automatically analyze and react on data related to the need of value added services, as e.g. accident notifications and/or feedback to the driver and/or automated fleet risk reporting and/or automated and dynamically optimized underwriting etc.). As embodiment variant, the score driving module can e.g. automatically capture scores risks according to a measured maintenance (e.g. maintenance failure by owner) and surveillance factor extracted from the automotive data associated with the autonomous or partially autonomous driving driving motor vehicle and/or the control systems or the use of active safety features. The telematics based feedback means of the system may e.g. comprise a dynamic alert feed via a data link to the autonomous or partially autonomous driving motor vehicle's automotive control circuit, wherein the expert-system or machine-learning based central circuit heads up device alerts drivers immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. The automotive car system provides the opportunities for risk-adaption and improvement dynamically and in real-time, i.e. as and when they happen, related to the autonomous or partially autonomous driving motor vehicle's risk patterns (e.g. location, speed, etc.). In the case of partial automation, providing instant feedback to drivers through heads up training aids and get information sent straight to the mobile telematics device, ensures a two pronged approach to correcting risky (and often expensive) driving habits. Thus, the automotive car system not only allows to mutually optimize the operational parameters of the first and second risk transfer system, but also optimize the risk and/or risk behavior on the level of the risk exposed autonomous or partially autonomous driving motor vehicles. No prior art system allows such an integral, real-time optimization. As another value added service, the automotive car system can e.g. dynamically generated fleet risk reports of selected motor vehicles. Such fleet reports, automatically generated by the automotive car system, provide a new approach to share and compare vehicles' statistics. The proposed invention with e.g. prefunding automotive enabled risk-transfer ((re)insurance) means will stimulate the carriers (first-tier risk-transfer systems) to provide its automotive data and claims' histories to the second-tier risk-transfer system in order to continually improve its scoring service, which in turn benefits carrier in helping reduce costs and combined ratio. In summary, the advantages of the present invention are, inter alia, that the system is able to measure and differentiate fully autonomous driving modes and the various level of manual and partially manual driving modes (ADAS). The system measures which mode is selected and appropriately adjust the risk-transfer parameters and premiums (for example higher risk, if the car is driven manually by a person, however depends on the measured contextual data). It is to be assumed that the premiums for traditional car in a world of increased numbers of semi- or fully autonomous driving car will go up. This can be captured by the dynamic generation of the appropriate risk-transfer and payment-transfer parameters by means of the present expert-system based invention, which is not possible by the known prior art systems. The system dynamically takes into account the used and/or activated ADAS/AV features, as well as their performance accuracy and operational quality to generate the variable and time-dependent risk-transfer parameters and the premium (e.g. safety features of the car type, model) and the ADAS systems (e.g., highway pilot, Park Assistance, Forward Collision Warning, Driver Monitoring, Lane Departure warning). The present system does also consider the ADAS features in their contextual relation, as e.g. under different weather condition. However, for partially autonomous driving cars (ADAS) also different user interaction based on different drivers are automatically considered by the system by capturing and transmitting also user-based data. Thus, the system can automatically adapt its operational parameters and be used, for example, in a rental scheme or borrowed scheme. Further, the present system automatically is able to differentiates and adapt its operational parameters (e.g. risk-transfer parameters) in connection with MTPL (Motor Third Party Liability) and/or MOD (Motor own Damage) covers with ADAS/AV risk parameters, and/or product liability to manufacturer (technology (for software/hardware) and car manufacturer), and/or maintenance failure by owner, and/or driverless taxi risk-transfer schemes, and/or car rental risk-transfer schemes, and/or transportation network companies risk-transfer schemes (like Uber (UberX, UberBlack, UberPop, or UberTaxi)), and/or private car sharing risk-transfer schemes.

In one alternative embodiment, the central, expert-system based circuit comprises a table with stored categorization trigger parameters for triggering a predefined level of automation applied by the control system to the autonomous or partially autonomous (ADAS) driving motor vehicles, wherein the first and second risk transfer parameters and the correlated first and/or second payment transfer parameters are dynamically adapted and/or accumulated by means of the central, expert-system based circuit based on the triggered categorization of the autonomous or partially autonomous driving motor vehicles during usage and based upon the usage-based and/or user-based and/or operational automotive data captured from the plurality of autonomous or partially autonomous driving motor vehicles. This embodiment has, inter alia, the advantage that it allows to provide new and unified approach for automated risk-transfer for risk associated with risk-exposed autonomous or partially autonomous driving motor vehicles, considering dynamically measured, usage-based parameters, allowing a new optimization in the level of the risk-exposed vehicle as well as on the level of the operational pooling of risk-exposure of the first and/or second risk-transfer system.

In one alternative embodiment, the central, expert-system based circuit comprises a driving score module triggering and automatically selecting score driving parameters based on defined score driving behavior pattern by comparing captured automotive data with the defined score driving behavior pattern. The score driving module can further e.g. automatically capture scores risks according to the measured location or trip of the motor vehicle based on the captured automotive data of the mobile telematics devices associated with the motor vehicles. This alternative embodiment has, inter alia, the advantage that it allows to provide a real-time adapted multi-tier risk-transfer system. Further, it allows to capture and/or control the score driving behavior (also in the sense of location, time, road etc. of the used autonomous or partially autonomous driving), and compare its behavior within the technical operation and context. It allows to automatically capture score risks according to location or trip, and to automatically analyze and react on data related to the need of added services, as e.g. accident notifications).

In one alternative embodiment, the central, expert-system based circuit comprises additional triggers triggering accident notification and/or other added services based on the captured automotive data of the automotive control circuits for autonomous or partially autonomous driving motor vehicle associated with the motor vehicles. This alternative embodiment has, inter alia, the advantage that the system is capable of providing additional benefit to the customer based on additionally generated signaling.

In another alternative embodiment, the switching device comprises capturing means for capturing a transfer of payment from the first insurance system to the second payment-transfer module, wherein the second layer trigger structure of the system is activatable by triggering a payment transfer matching a predefined activation threshold parameter. In another embodiment variant, in the case of triggering the occurrence of a loss associated with the occurrence of the defined risk events, a predefined defined portion of the occurred loss covered by the second insurance system based on the second risk transfer parameters and correlated second payment transfer parameters. Thus, the present invention can be realized with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, in case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can e.g. be based on a Per Risk XL (Working XL), Per Occurrence/Per Event XL (Catastrophe or Cat XL), or Aggregate XL structure. As a more particular alternative embodiment, a periodic payment transfers from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of the automotive control circuit by means of the risk event triggers, and wherein the independent verification risk event trigger additionally issues a trigger in the event of the occurrence of indicators regarding risk events in an alternative data flow pathway with independent measuring parameters from the primary data flow pathway, e.g. of alternative telematics devices, in order to verify the occurrence of the risk events at the risk exposed automotive motor vehicles. In this alternative, the transfer of payments is only assigned to the corresponding risk exposed motor vehicle if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, e.g. also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the advantage that additionally the second insurance system distinctively can be activated, allowing a controlled and discrete risk transfer and risk cover from the first to the second resource pooling system.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the central, expert-system or machine-learning based automotive circuit comprises means for processing risk-related autonomous or partially autonomous driving motor vehicle data and for providing data regarding the likelihood of said risk exposure for one or a plurality of the pooled risk exposed autonomous or partially autonomous driving motor vehicle, in particular, based on the risk-related autonomous or partially autonomous driving motor vehicle data, and wherein the receipt and preconditioned storage of payments from the risk exposed motor vehicles for the pooling of their risks can be dynamically determined based on the total risk and/or the likelihood of risk exposure of the pooled risk-exposed autonomous or partially autonomous driving motor vehicles. This alternative embodiment has, inter alia, the advantage that the operation of the first and/or second resource pooling system can be dynamically adjusted to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk exposed autonomous or partially autonomous driving motor vehicles is directly related to the total pooled risk. However, it is important to note, that the present invention does not necessarily have to lead to adjusted pricing or premiums. For example, it could also automatically provide coupons to automated motor vehicles driving in low risk regions, or that nothing at all changes but that the system uses the automotive data to automatically decide if the risk-transfer is continued the next year. The present invention can also exclusively be used for automatically providing and activating adapted and/or specifically selected value added services, as e.g. accident notifications and/or feedback to the autonomous or partially autonomous driving motor vehicle or driver and/or automated fleet risk reporting and/or automated and dynamically optimized underwriting etc. Thus, the present invention allows an adaption of the risk of the first risk-transfer tier or system as well as risk on level of the insured motor vehicles (e.g. by risk-based driver feedback in real-time) and/or the second risk-transfer tier or system. There is no prior art system, allowing such an optimization and/or adaption. The feedback can e.g. be generated by comparing the autonomous or partially autonomous driving motor vehicle's profile and pattern with other autonomous or partially autonomous driving motor vehicle's profiles or pattern at the same location and/or comparable conditions.

In one alternative embodiment, the system comprises means for processing risk-related component data and for providing information regarding the likelihood of said risk exposure for one or a plurality of the pooled risk exposed, autonomous or partially autonomous driving motor vehicles, in particular, based on risk-related motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk-transfer system to a range where non-covariant, occurring risks covered by the risk-transfer system affect only a relatively small proportion of the total pooled risk exposure components at any given time. Analogously, the second risk-transfer system can for example dynamically adjust the number of pooled risk shares transferred from first risk-transfer systems to a range where non-covariant, occurring risks covered by the second risk-transfer system affect only a relatively small proportion of the total pooled risk transfers from first risk-transfer systems at any given time. This variant has, inter alia, the advantage that the operational and financial stability of the system can be improved.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and wherein the total allocated payment is transferrable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example be dependent on the stage of the occurrence of a risk event, as triggered by the system.

In addition to the system, as described above, and the corresponding method, the present invention also relates to a computer program product that includes computer program code means for controlling one or more processors of the control system such that the control system performs the proposed method; and it relates, in particular, to a computer program product that includes a computer-readable medium that contains the computer program code means for the processors.

BRIEF DESCRIPTION OF THE DRAWINGS

The present invention will be explained in more detail, by way of example, with reference to the drawings in which:

FIG. 1 shows a block diagram schematically illustrating 4 levels of automation and impact on risk-transfer, claims and liabilities (source NHTSA (National Highway Traffic Safety Administration) of the U.S. government's Department of Transportation, responsible for the regulatory requirements of the Federal Motor Vehicle Safety Standards). The central, expert-system based circuit 11 of the automotive car system 1 can e.g. comprise a table, as illustrated by FIG. 1, comprising categorization trigger parameters for triggering a predefined level of automation of the motor vehicles 41, ..., 45 applied by the control system 461, ..., 465 to the autonomous or partially autonomous driving motor vehicles 41, ..., 45. The first and second risk transfer parameters 501, ..., 505/511, ..., 515 and the correlated first and/or second payment transfer parameters 1021, ..., 1025/1221, ..., 1225 are dynamically adapted and/or accumulated by means of the central, expert-system based circuit 11 based on the triggered categorization of the autonomous or partially autonomous driving motor vehicles 41, ..., 45 during usage and based upon the usage-based 31 and/or user-based 32 and/or operational 33 automotive data 3 captured from the plurality of autonomous or partially autonomous driving motor vehicles 41, ..., 45.

DETAILED DESCRIPTION OF THE PREFERRED EMBODIMENTS

Figure 2:
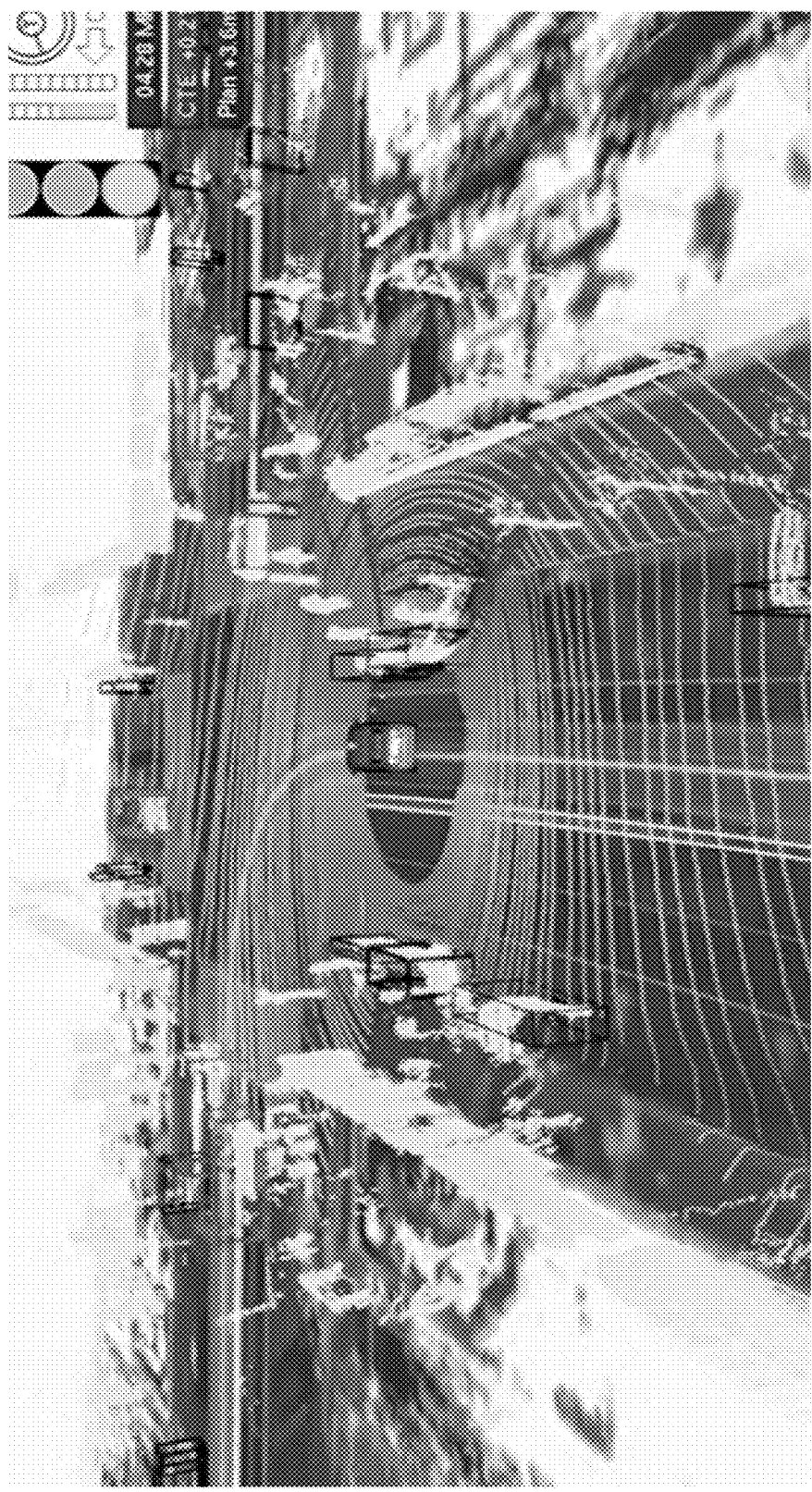
FIG. 2 shows schematically an exemplary sensing of environmental parameters 40111 at least comprising distances to objects and/or intensity of the ambient light and/or sound amplitude by means of the exteroceptive sensors or measuring devices 4011 of the motor vehicles 41, ..., 45, i.e. how the on-board automotive control system 9 for autonomous or partially autonomous driving of the motor vehicles 41, ..., 45 interpreting the sensory data 40111/40121 of the exteroceptive sensors or measuring devices 4011 and the proprioceptive sensors or measuring devices 4012, on one example out of Google's fleet of robotic Toyota Priuses (spectrum.ieee.org). Such cars are capable of complete autonomous car driving or at least driving in city traffic, busy highways, and mountainous roads with only occasional human intervention.

FIG. 1 schematically illustrates an architecture for a possible implementation of an embodiment of the automotive, expert-system based, dynamic triggered, multi-tier risk-transfer and risk-prediction system 1 with an event-triggered activation for complementary switching of two coupled, autonomously operated risk-transfer systems 10, 12. In particular, it shows an expert-system based or machine-learning based automotive car system 1. The risk-transfer system 10 can correspond to an automated insurance system and the risk-transfer system 12 can correspond to an automated reinsurance system. System 1 provides a dynamic triggered and adjusted, multi-tier risk-transfer system based on the expert-system based automotive car system 1, thereby reinforcing the importance of developing automated real-time systems allowing self-sufficient and optimized multi-tier risk-transfer operation. Multi-tier risk-transfer is realized by the coupled first and second risk-transfer or insurance system 10, 12. The system 1 is triggered, i.e. dynamically tuned and adapted to trigger activation of the first and second insurance system 10/12 based on capture usage-based 31 and/or user-based 32 automotive data 3 of the autonomous or partially autonomous driving motor vehicle 41, . . . , 45 and/or user 321, 322, 323. The autonomous or partially autonomous driving motor vehicles 41, . . . , 45 or the automotive control systems 461, . . . , 465 are connected to a central, expert-system based circuit 11 by means of mobile telematics devices 411, . . . , 415 of the motor vehicles 41, . . . , 45. A data link 21 is set by means of the wireless connection 411, . . . , 415 between the central, expert-system based circuit 11 and the autonomous motor vehicles 41, . . . , 45 transmitting at least said usage-based 31 and/or user-based 32 and/or operating 33 automotive data 3 via the mobile telematics devices 411, . . . , 415 to the central, expert-system based circuit 11. The usage-based 31 and/or user-based 32 automotive data 3 comprise at least automotive data 3 on when and/or how often and/or where and/or how the driver is driving and/or what the motor vehicle 41, . . . , 45 is doing and to what extent safety, automated, or autonomous features are active. The automotive data 3 are measured or captured by control circuit for autonomous motor vehicle driving 461, . . . , 465 by means connected or integrated on-board sensors and measuring devices 401, . . . , 405. The automotive control systems 461, . . . , 465 measures at least a level of automation of the car driving and/or the activation of autonomous driving support means of the specific motor vehicle 41, . . . , 45, and transmits the measured level of automation of the car driving and/or the activation of autonomous driving support means of the specific motor vehicle 41, . . . , 45 as part of the automotive data 3 via the mobile telematics devices 411, . . . , 415 to the central, expert-system based circuit 11. A possible fragmentation in automation levels is shown in FIG. 1. FIG. 1 shows a differentiation in 4 levels of automation and impact on risk-transfer, claims and liabilities as provided by NHTSA (National Highway Traffic Safety Administration) of the U.S. government's Department of Transportation, responsible for the regulatory requirements of the Federal Motor Vehicle Safety Standards). The levels are defined as follows: (Level 0) The driver completely controls the vehicle at all times; (Level 1) Individual vehicle controls are automated, such as electronic stability control or automatic braking; (Level 2) At least two controls can be automated in unison, such as adaptive cruise control in combination with lane keeping. Example: Tesla Model S; (Level 3) The driver can fully cede control of all safety-critical functions in certain conditions. The car senses when conditions require the driver to retake control and provides a "sufficiently comfortable transition time" for the driver to do so; and (Level 4) The vehicle performs all safety-critical functions for the entire trip, with the driver not expected to control the vehicle at any time. As this vehicle controls all functions from start to stop, including all parking functions. It may include unoccupied cars. Alternative classification system, e.g. based on five different levels (ranging from driver assistance to fully automated systems), are also imaginable, as for example published by SAE (Society of Automotive Engineers. However, other fragmentations can be preferable, for example, based on predefined risk-prediction classes. This means, that the central, expert-system based circuit 11 of the automotive car system 1 can e.g. comprise a searchable (hash) table, as illustrated by FIG. 1, comprising categorization trigger parameters for triggering a predefined level of automation of the motor vehicles 41, . . . , 45 applied by the control system 461, . . . , 465 to the autonomous motor vehicles 41, . . . , 45. In consequence, the first and second risk transfer parameters 501, . . . , 505/511, . . . , 515 and the correlated first and/or second payment transfer parameters 1021, . . . , 1025/1221, . . . , 1225 are dynamically adapted and/or accumulated by means of the central, expert-system based circuit 11 at least based on the triggered categorization of the autonomous motor vehicles 41, . . . , 45 during usage and based upon the usage-based 31 and/or user-based 32 and/or operational 33 automotive data 3 captured from the plurality of autonomous motor vehicles 41, . . . , 45. Thus, the generated first and second risk transfer parameters 501, . . . , 505/511, . . . , 515 and correlated first and second payment transfer parameters 1021, . . . , 1025/1221, . . . , 1225 can at least depend on the measured level of automation of the car driving and/or activation of autonomous driving support means of the specific motor vehicle 41, . . . , 45.

Further, the first and second risk transfer parameters 501, . . . , 505/511, . . . , 515 and correlated first and second payment transfer parameters 1021, . . . , 1025/1221, . . . , 1225 can be generated by means of the central, expert-system based circuit 11 at least depend on the activation of autonomous driving support means of the specific motor vehicle 41, . . . , 45 in relation to contextual and/or environmental data of the transmitted automotive data 3, wherein the impact of the activation of a specific autonomous driving support mean to the generated parameters depend on the simultaneous measured, time-dependent contextual data of the transmitted automotive data 3. Said simultaneous measured, time-dependent contextual and/or environmental data of the transmitted automotive data 3 at least comprise measured weather condition parameters and/or location coordinate parameters. It is important to note, that the autonomous driving support means of the specific motor vehicle 41, . . . , 45, as for example Adaptive Cruise Control (ACC), adaptive high beam, glare-free high beam and pixel light, adaptive light control: swiveling curve lights, automatic parking, automotive navigation system with typically GPS and TMC (Traffic Message Channel) for providing up-to-date traffic information, automotive night vision, blind spot monitor, collision avoidance system (pre-crash system), crosswind stabilization, driver drowsiness detection, driver monitoring system, electric vehicle warning sounds used in hybrids and plug-in electric vehicles, emergency driver assistant, forward collision warning, intersection assistant, hill descent control, intelligent speed adaptation or intelligent speed advice (ISA), lane departure warning system, lane change assistance, pedestrian protection system, traffic sign recognition, turning assistant, vehicular communication systems, and/or wrong-way driving warning typically work well in certain environments (e.g. motorways etc.), thus reducing the risk there. However, they may perform less optimal, not at all, or even increase a possible accident-risk in other environments, where the autonomous driving feature or device is not able to operate correctly (e.g. high traffic places as city centers, or small and curvaceous roads etc.). Therefore an autonomous driving feature of the motor vehicles 41, . . . , 45 may reduce a driving risk, as well as increase a driving risk dependent on contextual and/or environmental automotive data 3 of the motor vehicle 41, . . . , 45. As an embodiment variant, the system 1 can e.g. measure a time-dependent contextual score parameter based on the contextual and/or environmental data of the transmitted automotive data 3, and a car-manufacturer score parameter for each activated autonomous driving support mean of the specific motor vehicle 41, . . . , 45. The car-manufacturer score parameters can be determined based on performance and/or efficiency and/or quality measurements of the activated autonomous driving support mean of the specific motor vehicle 41, . . . , 45, wherein the first and second risk transfer parameters 501, . . . , 505/511, . . . , 515 and correlated first and second payment transfer parameters 1021, . . . , 1025/1221, . . . , 1225 generated by means of the central, expert-system based circuit 11 at least depend on the measured contextual score parameters and the car-manufacturer score parameters.

Figure 3:
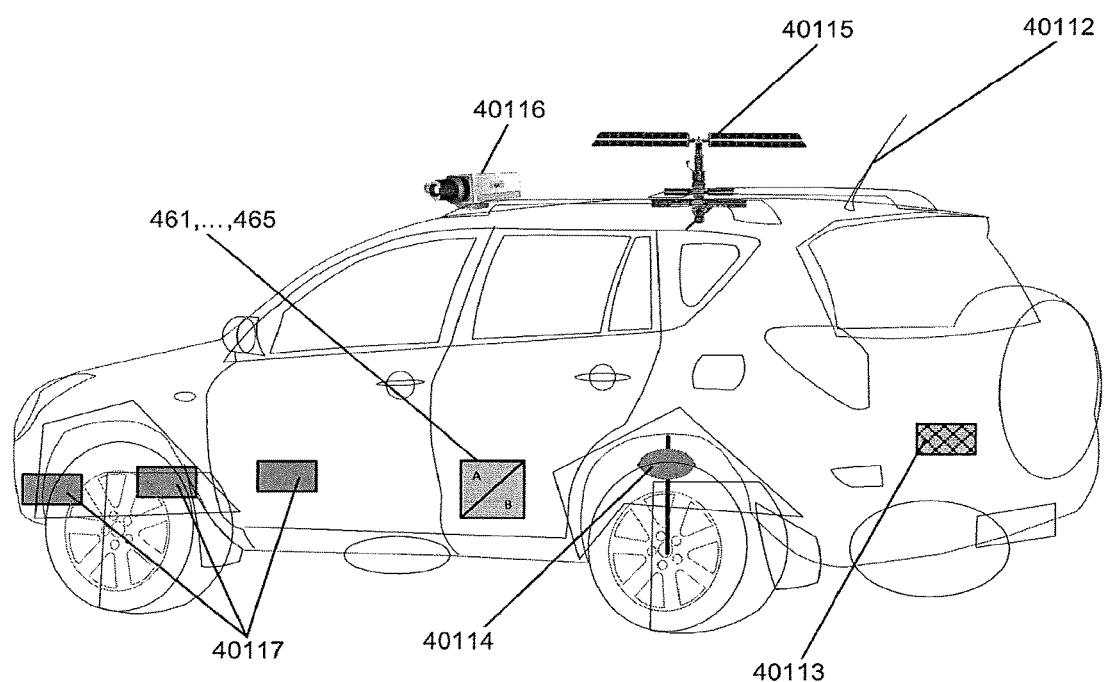
FIG. 3 shows schematically an exemplary autonomous driving motor vehicles 41, ..., 45 with exemplary on-board sensors and measuring devices 401, ..., 405, i.e. the sensory data 40111/40121 capturing exteroceptive sensors or measuring devices 4011, the proprioceptive sensors or measuring devices 4012, and mobile telematics device 411, ..., 415. Related to the exteroceptive sensors or measuring devices 4011, reference number 40112 denotes a global positioning system GPS (combined with measuring data from tachometers, altimeters and gyroscopes providing an accurate positioning), reference number 40113 ultrasonic sensors (measuring the position of objects very close to the motor vehicles 41, ..., 45), reference number 40114 odometry sensors (complementing and improving GPS information), reference number 40115 a LIDAR (light detection and ranging) measuring device (monitoring the vehicle's surroundings as e.g. roads, vehicles, pedestrians, etc.), reference number 40116 video cameras (monitoring the vehicle's surroundings, as e.g. roads, vehicles, pedestrians, etc. and reading traffic lights), and reference number 40117 radar sensors (monitoring the vehicle's surroundings, as e.g., roads, vehicles, pedestrians, etc.).

The on-board sensors and measuring devices 401, . . . , 405 comprise exteroceptive sensors or measuring devices 4011 and proprioceptive sensors or measuring devices 4012. FIG. 3 shows an exemplary autonomous driving motor vehicle 41, . . . , 45 with exemplary on-board sensors and measuring devices 401, . . . , 405, i.e. the sensory data 40111/40121 capturing exteroceptive sensors or measuring devices 4011, the proprioceptive sensors or measuring devices 4012, and mobile telematics device 411, . . . , 415. The exteroceptive sensors or measuring devices 4011 measure values, parameters and information from the autonomous or partially autonomous driving motor vehicle 41, . . . , 45, i.e. the robot's environment, as distances to objects, intensity of the ambient light, sound amplitude. The proprioceptive sensors or measuring devices 4012 measure values or parameters, in particular operational parameters, internally to the autonomous or partially autonomous driving motor vehicle 41, . . . , 45, as e.g. motor speed, wheel load, heading of the robot, battery status etc. Related to the exteroceptive sensors or measuring devices 4011, reference number 40112 denotes a global positioning system GPS (combined with measuring data from tachometers, altimeters and gyroscopes providing an accurate positioning), reference number 40113 ultrasonic sensors (measuring the position of objects very close to the motor vehicles 41, ..., 45), reference number 40114 odometry sensors (complementing and improving GPS information), reference number 40115 a LIDAR (light detection and ranging) measuring device (monitoring the vehicle's surroundings as e.g. roads, vehicles, pedestrians, etc.), reference number 40116 video cameras (monitoring the vehicle's surroundings, as e.g. roads, vehicles, pedestrians, etc. and reading traffic lights), or V2V (Vehicle-to-Vehicle) and VII (Vehicle Infrastructure Integration) communication technologies, and reference number 40117 radar sensors (monitoring the vehicle's surroundings, as e.g., roads, vehicles, pedestrians, etc.). The exteroceptive and proprioceptive sensors or measuring devices 4011/4012 can comprise passive sensors, which use the energy coming for the environment, as e.g. temperature probes, microphones, web cameras, or active sensors emitting their proper energy and measuring the reaction (e.g. laser). Active sensors often allow for a better performance, but sometimes have influences on the autonomous or partially autonomous driving vehicle's 41, ..., 45 environment. Note, that some of the sensory data 40111/40112 necessarily need combination with other measuring devices, due to their performance characteristics, resolution, or range. An example are wheel sensors measuring position or speed of the wheels or steering. The used optical encoders are proprioceptive sensors 4012, thus the position estimation in relation to a fixed reference frame is only valuable for short movements. The typical resolutions range from 64-2048 increments per revolution. To improve the resolution, quadrature encoders are often to derive the higher resolution and/or directional information.

The system 1 with the first and second risk-transfer systems 10, 12 provide automated, self-sufficient risk protection of a variable number of risk exposed motor-vehicles 41, ..., 45 by means of two associated, automated resource pooling systems 101, 121. I.e., the first risk-transfer system 10 comprises an automated first resource pooling system 101 and the second risk-transfer system 12 comprises an automated second resource pooling system 121. The risk exposed autonomous or partially autonomous driving motor vehicles 41, ..., 45 are connected to the first resource pooling system 101 by means of the plurality of payment transfer modules 103 configured to receive and store 102 first payments 1021, ..., 1025 from the risk exposed autonomous or partially autonomous driving motor vehicles 41, ..., 45 for the pooling of their risk exposures 51, ..., 55, wherein the first risk-transfer system 10 provides the automated risk protection for each of the connected risk exposed autonomous or partially autonomous driving motor vehicles 41, ..., 45 based on received and stored first payment parameters 1021, ..., 1025. Further, the first risk-transfer system 10 is connected to the second resource pooling system 121 by means of second payment transfer modules 123 configured to receive and store 122 second payment parameters 1221, ..., 1225 from the first insurance system 10 for adopting of a portion of the risk exposures 51, ..., 55 accumulated by the first risk-transfer system 10. Thus, in the case of the occurrence of one of defined risk events 61, ..., 63 the occurred loss is automatically covered by the expert-system based automotive car system 1 comprising the first and second risk-transfer systems 10/12.

Figure 4:
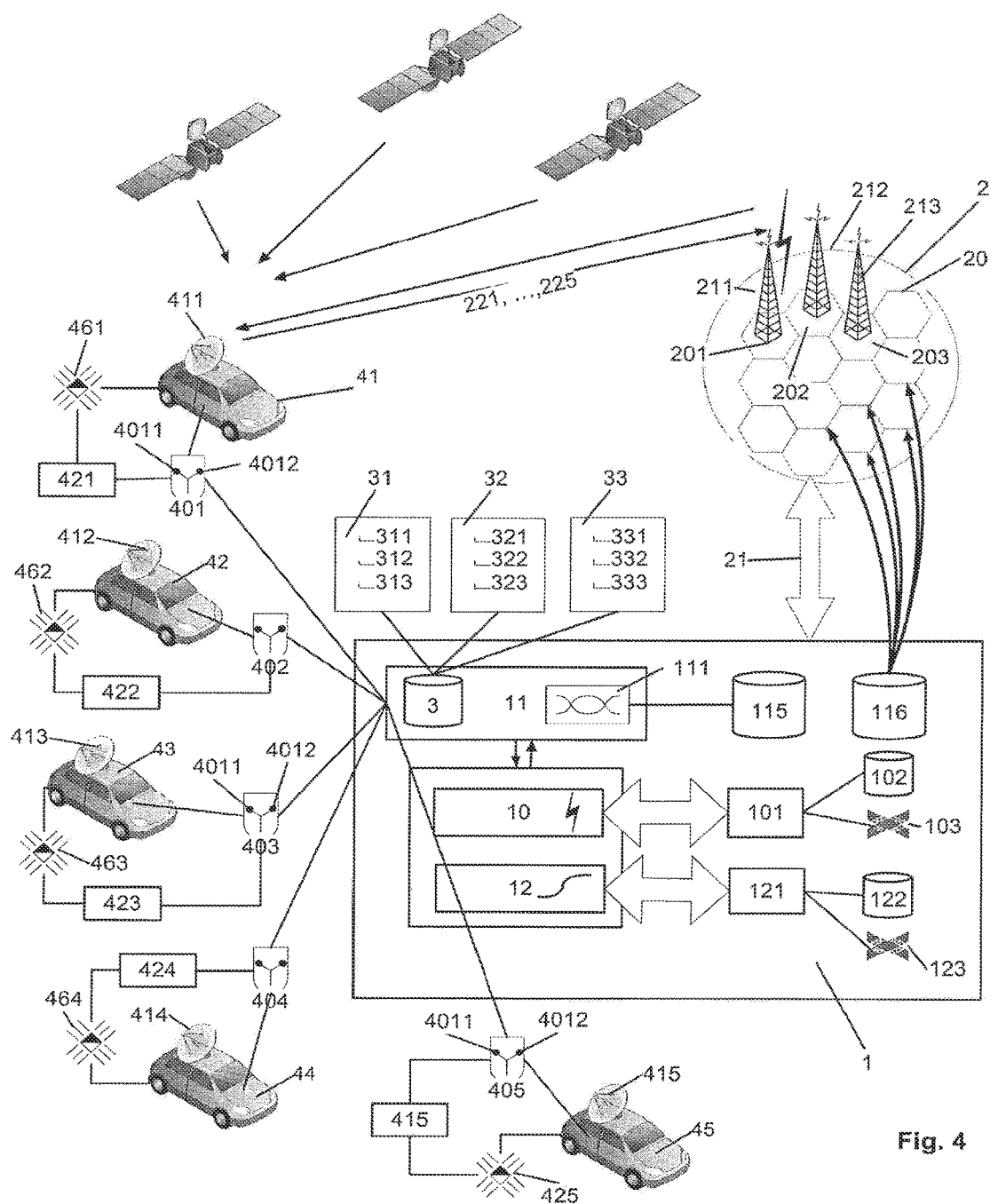
FIG. 4 shows a block diagram schematically illustrating an exemplary automotive-based, dynamic triggered, multitier risk-transfer system provided by the inventive automotive system 1 with a plurality of associated autonomous or partially autonomous driving driving motor vehicles 41, ..., 45 capturing measuring parameters in real-time and dynamically adapting its operational parameters. In particular, it shows an expert-system based or machine-learning based automotive system 1. The autonomous or partially autonomous driving motor vehicles 41, ..., 45 comprise exteroceptive sensors or measuring devices 4011 for sensing environmental parameters 40111 at least comprising distances to objects and/or intensity of the ambient light and/or sound amplitude, and proprioceptive sensors or measuring devices 4012 for sensing operating parameters of the motor vehicles 41, ..., 45 comprising at least motor speed and/or wheel load and/or heading and/or battery status of the motor vehicles 41, ..., 45, the autonomous or partially autonomous driving motor vehicles 41, ..., 45 comprising an automotive control circuit 461, ..., 465 for autonomous or partially autonomous driving of the motor vehicles 41, ..., 45 by interpreting the sensory data 40111/40121 of the exteroceptive and proprioceptive sensors or measuring devices 4011/4012 identifying appropriate navigation paths and/or obstacles and/or relevant signage. The autonomous or partially autonomous driving motor vehicles 41, ..., 45 or the automotive control systems 461, ..., 465 are connected to a central, expert-system based circuit 11 by means of a data link 21 transmitting at least usage-based 31 and/or user-based 32 and/or operating 33 automotive data 3 to the central, expert-system based circuit 11, wherein the usage-based 31 and/or user-based 32 and/or operational 33 automotive data 3 are based on the sensory data 40111/40121 and/or operating parameters 4611 of the automotive control system 461, ..., 465. The automotive car system 1 provides an automated first and/or second risk-transfer by means of the risk-transfer systems 10/12 based on dynamic generated first and/or second risk transfer parameters 501, ..., 505/1021, ..., 1025 from the autonomous or partially autonomous driving motor vehicles 41, ..., 45, wherein by means of the central, expert-system based circuit 11 the first and/or second risk transfer parameters 501, ..., 505/1021, ..., 1025 and correlated first and/or second payment transfer parameters 1021, ..., 1025/1221, ..., 1225 are dynamically generated, adapted and/or optimized, wherein, in the case of triggering the occurrence of one of defined risk events 61, ..., 63, the occurred loss 71, ..., 75 is automatically covered by the automotive car system 1.
Figure 5:
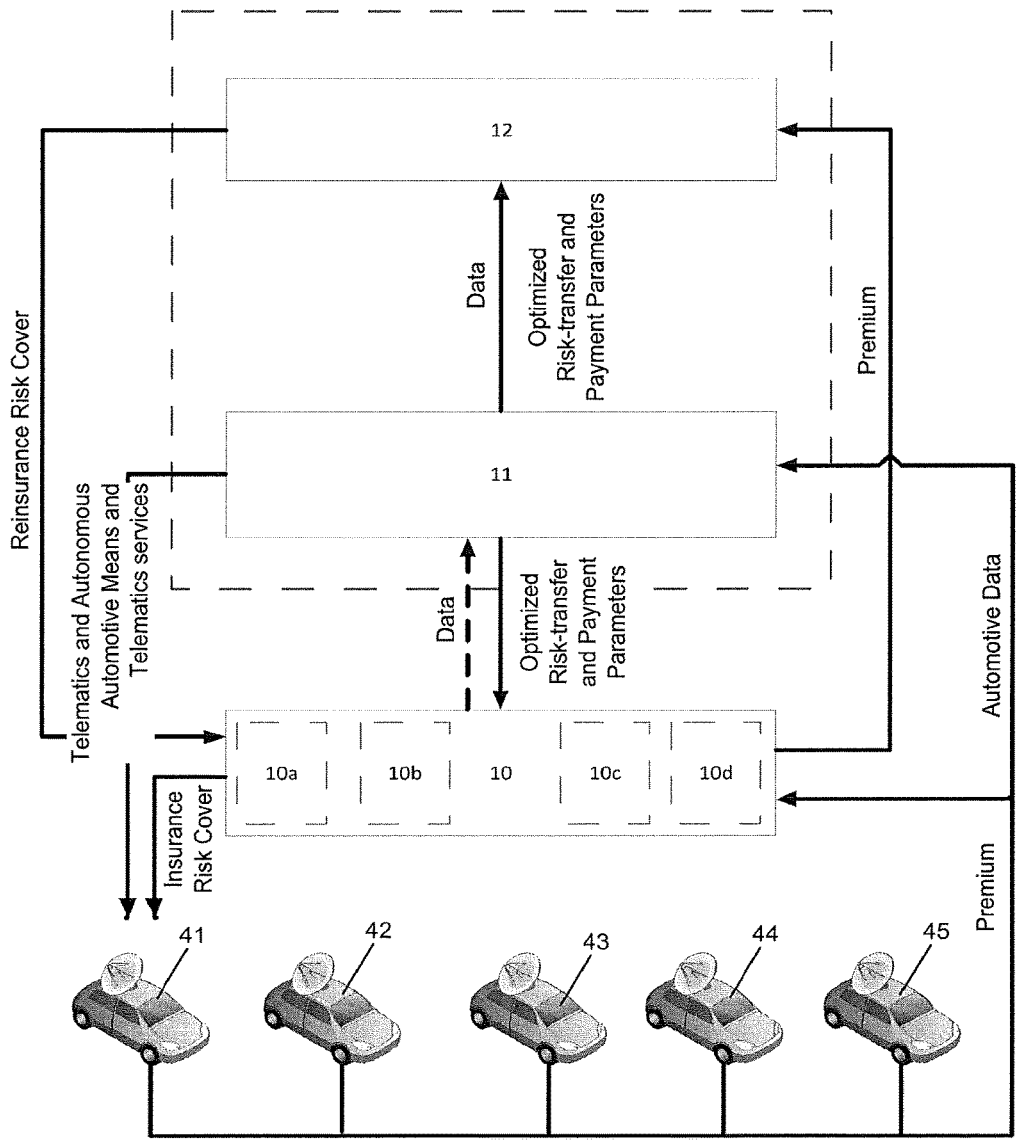
FIG. 5 shows a block diagram schematically illustrating an exemplary automotive-based, dynamic triggered, multitier risk-transfer system provided by the inventive automotive system 1 with a plurality of associated autonomous or partially autonomous driving motor vehicles 41, ..., 45 capturing measuring parameters in real-time and dynamically adapting its operational parameters, according an embodiment variant of the invention. In particular, it shows the expert-system based automotive system 1. The telematics devices 401, ..., 405 capture usage-based 31 and/or user-based 32 and/or operational 33 automotive data 3 of the motor vehicle 41, . . . , 45 and/or user 321, 322, 323, and transmit them via the data transmission network 2 to the central, expert-system based circuit 11, which operates the coupled first and second risk-transfer systems by means of the dynamically optimized the first and second risk transfer parameters 501, . . . , 505/511, . . . , 515 and the correlated first and second payment transfer parameters 1021, . . . , 1025/1221, . . . , 1225. The system 1 is capable of capturing different kinds of telematics data 3, as also e.g. driving patterns from the motor vehicles 41, . . . , 45 and/or automation level of the motor vehicle 41, . . . , 45 (driving itself partially or fully autonomous (auto piloting)) and/or if the user is intervening with its automated or safety features. The latter is possible, if the automotive control circuit 461, . . . , 465 capture data 3 from the motor vehicle 41, . . . , 45 itself. Thus, the automotive control circuits 461, . . . , 465 or an appropriate mobile phone apps connected to automotive control circuit 461, . . . , 465 can generate data 3 itself by means of own sensors, and/or the mobile telematics device 401, . . . , 405 or mobile phone apps connected to mobile telematics device 401, . . . , 405 can comprise access to data directly from the motor vehicle 41, . . . , 45, e.g. provided by an on-board diagnostic system. As seen from FIG. 2, the central, expert-system based circuit 11 may be realized as a separate part of the automotive system 1, or as a part of the second risk-transfer system 12, wherein in the latter case, the automotive control circuit 461, . . . , 465 and/or the mobile telematics devices 401, . . . , 405 can be provided by the second risk-transfer system 12 to the first risk-transfer system 10 and/or the risk exposed autonomous or partially autonomous driving motor vehicles 41, . . . , 45, in exchange of having access to the captured automotive data 3 and/or captured claim or loss data 711, . . . , 715/721, . . . , 725/731, . . . , 735. As also illustrated by FIG. 2, the automotive system 1 may comprise one (reference number 10) or a plurality (reference number 10a-10d) of first risk-transfer systems, all associated with the same second risk-transfer system 12.
Figure 6:
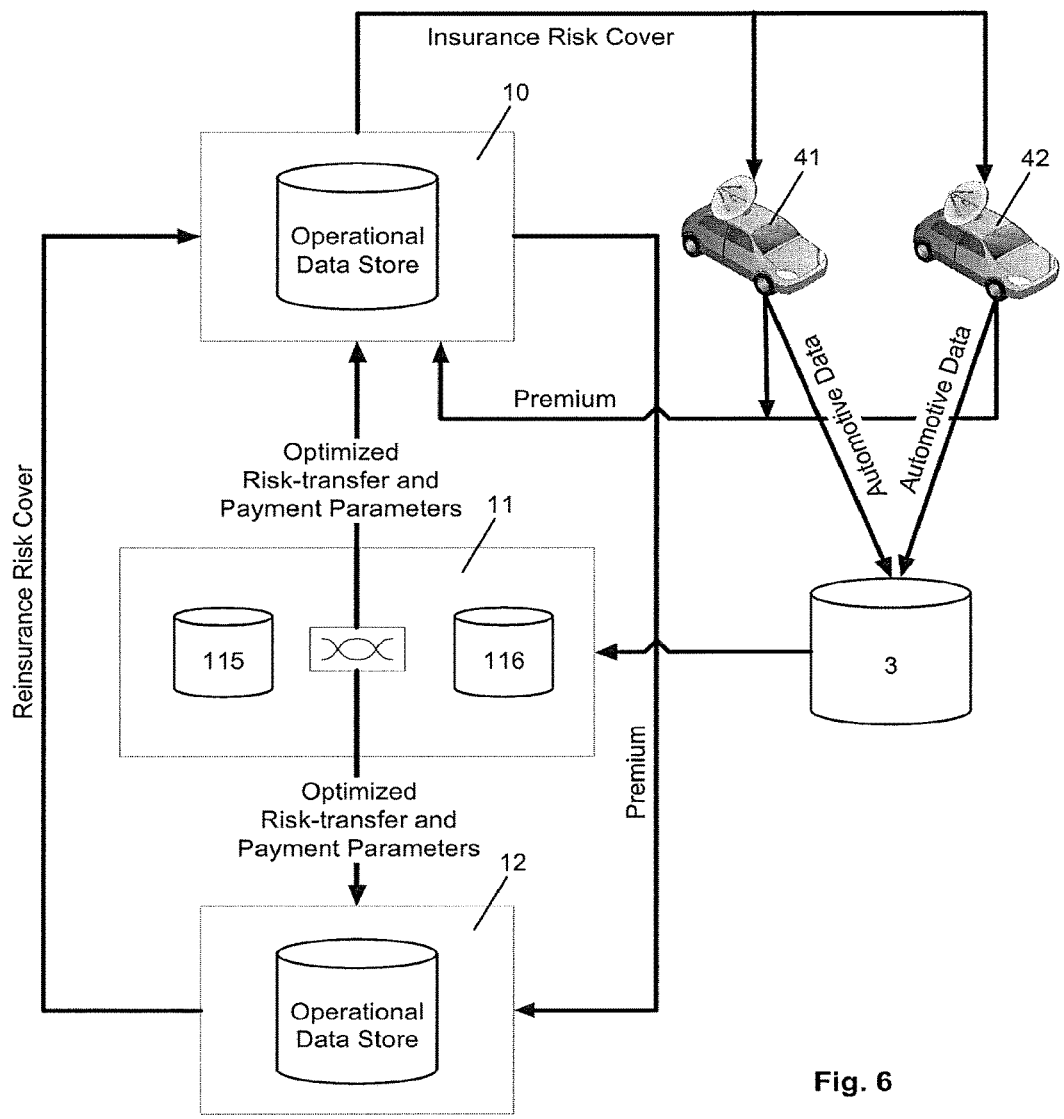
FIG. 6 shows another block diagram schematically illustrating an exemplary dynamically adaptable automotive car system 1 with a plurality of risk-exposed, associated autonomous or partially autonomous driving motor vehicles 41, . . . , 45, according an embodiment variant of the invention. In particular, it shows an expert-system based or machine-learning based automotive car system 1. The automotive control circuits 461, . . . , 465 for autonomous motor vehicle driving capture usage-based 31 and/or user-based 32 and/or operating 33 automotive data 3 of the motor vehicle 41, . . . , 45 and/or user 321, 322, 323, and transmit them by means of the telematics devices 411, . . . , 415 via the data transmission network 2 to the central, expert-system based circuit 11, which operates the coupled first and second risk-transfer systems 10/12 by means of the dynamically optimized the first and second risk transfer parameters 501, . . . , 505/511, . . . , 515 and the correlated first and second payment transfer parameters 1021, . . . , 1025/1221, . . . , 1225.
Figure 7:
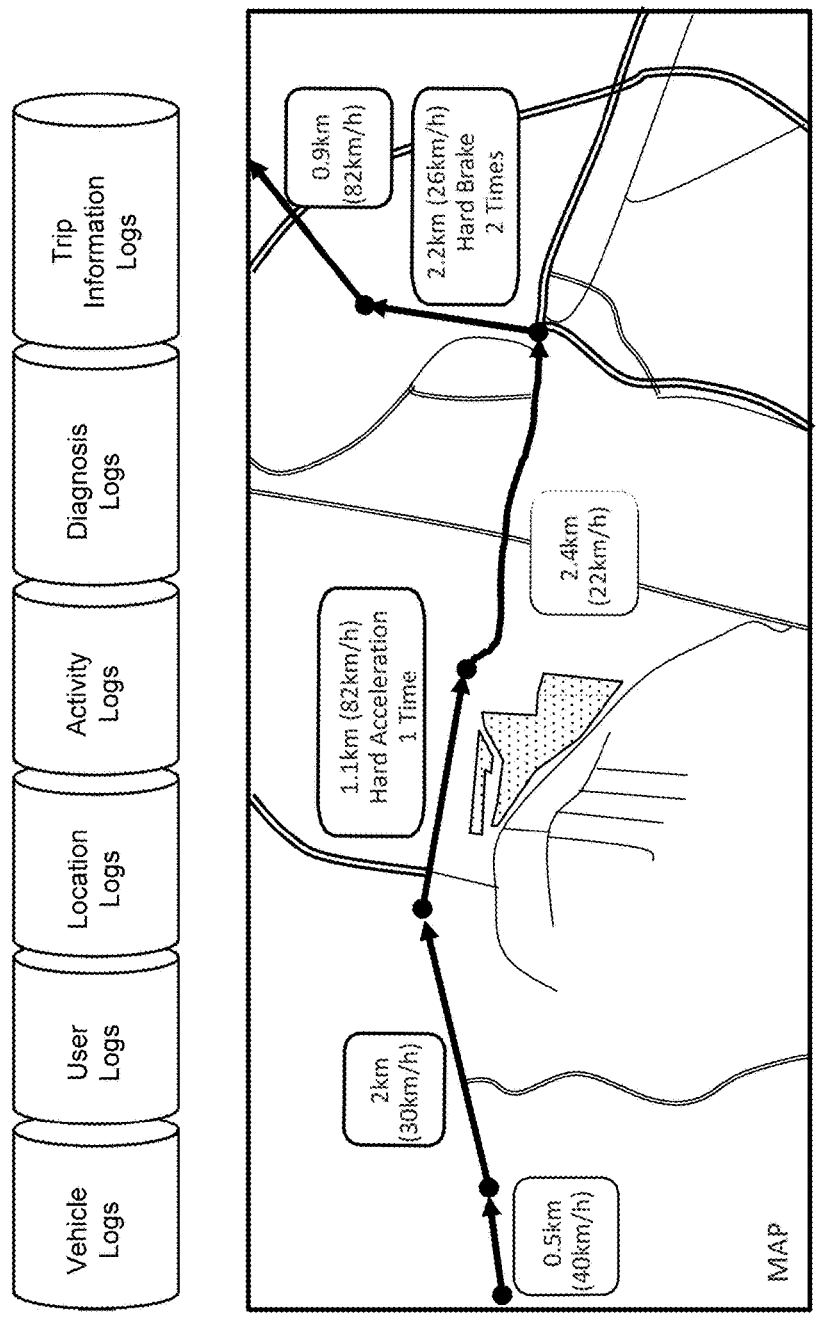
FIG. 7 shows a block diagram schematically illustrating exemplary the real-time automotive data capturing by means of the exteroceptive sensors 4011 for sensing environmental parameters 40111, and proprioceptive sensors 4012 for sensing operating parameters of the motor vehicles 41, . . . , 45.
Figure 8:
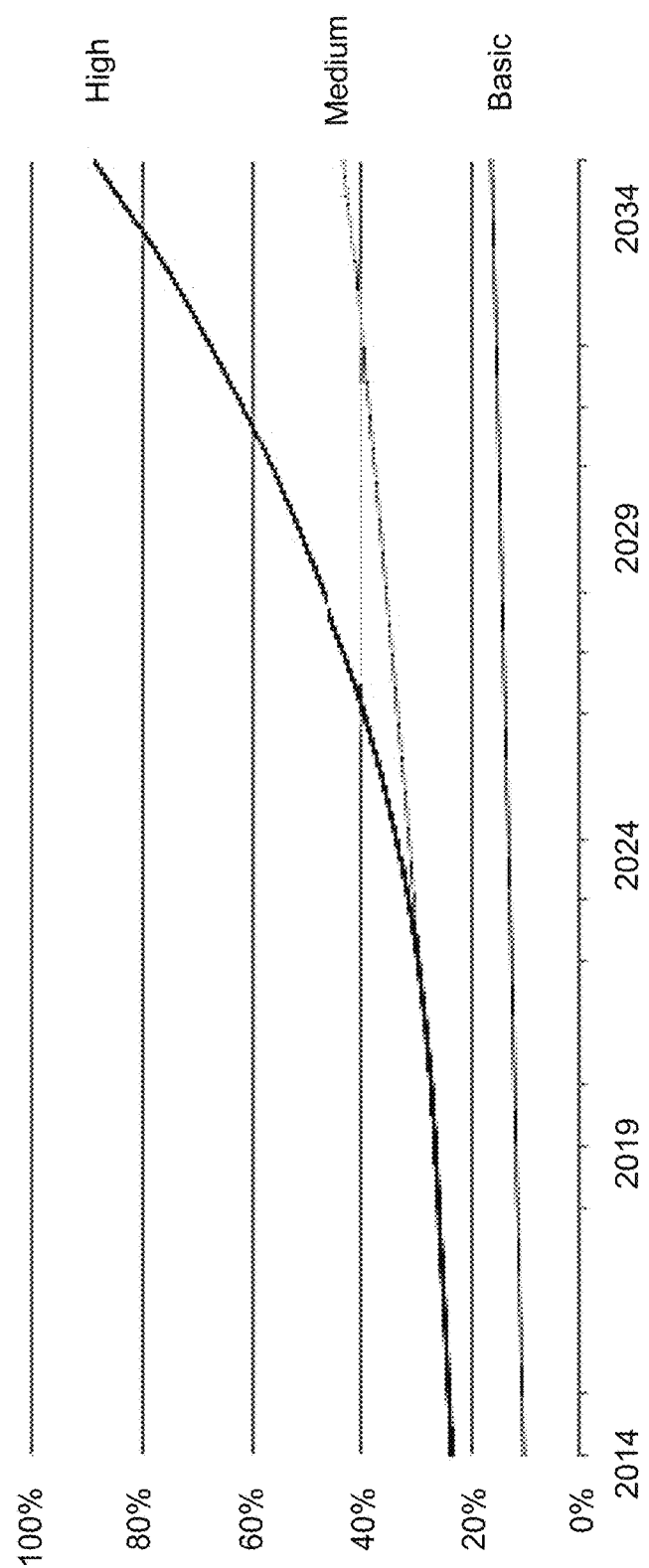
FIG. 8 shows a block diagram schematically illustrating exemplary estimates for accident reduction rates, i.e. the extent to which automated vehicles reduce accidents in %, wherein the x-axis gives the development within the years and the y-axis the automation in percentage. 100% means a fully autonomous driving motor vehicle, which does not need any human interaction.
Figure 9:
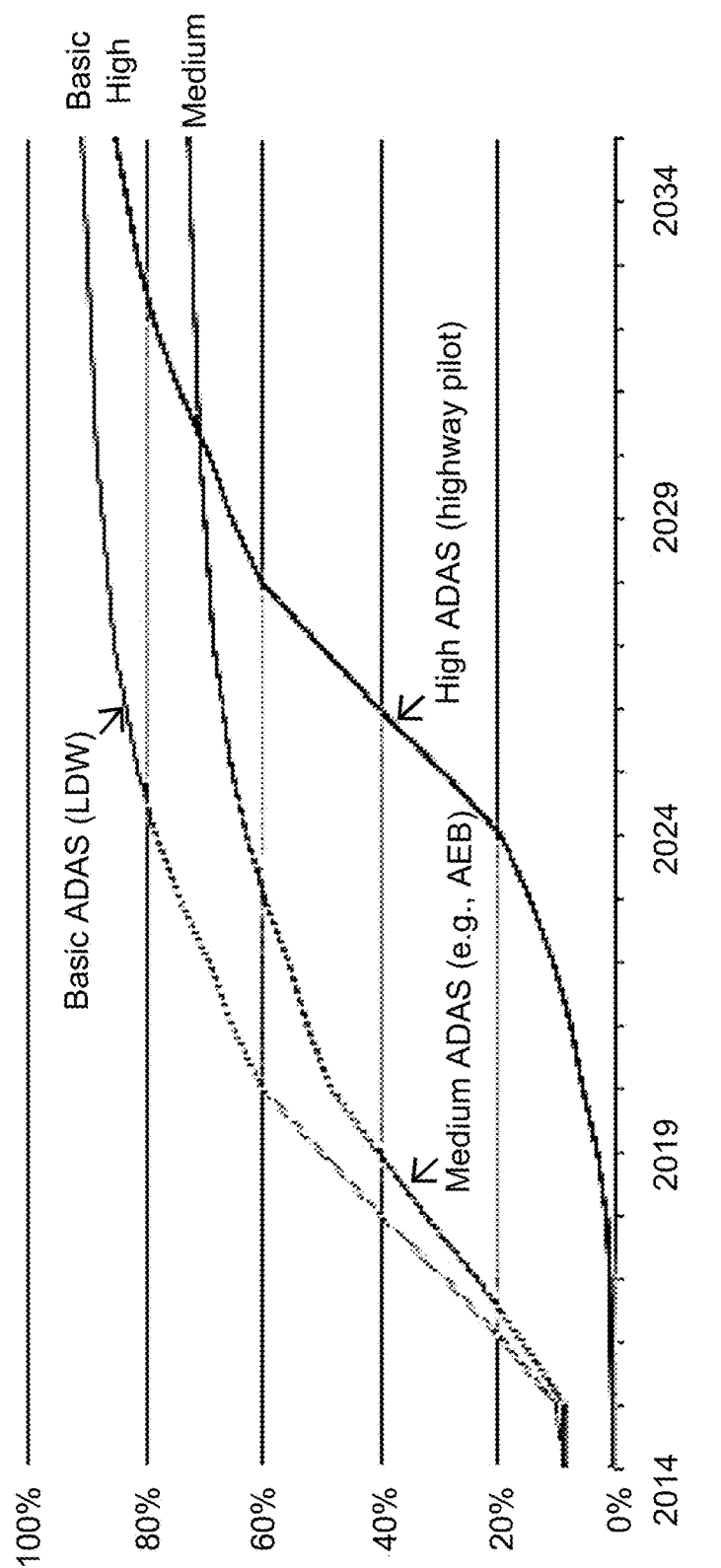
FIG. 9 shows a block diagram schematically illustrating exemplary the global average adoption rate of automated features for new passenger cars, wherein the x-axis gives the development within the years and the y-axis the automation adoption in percentage. 100% means that all cars use the respective automation adoption.
Figure 10:
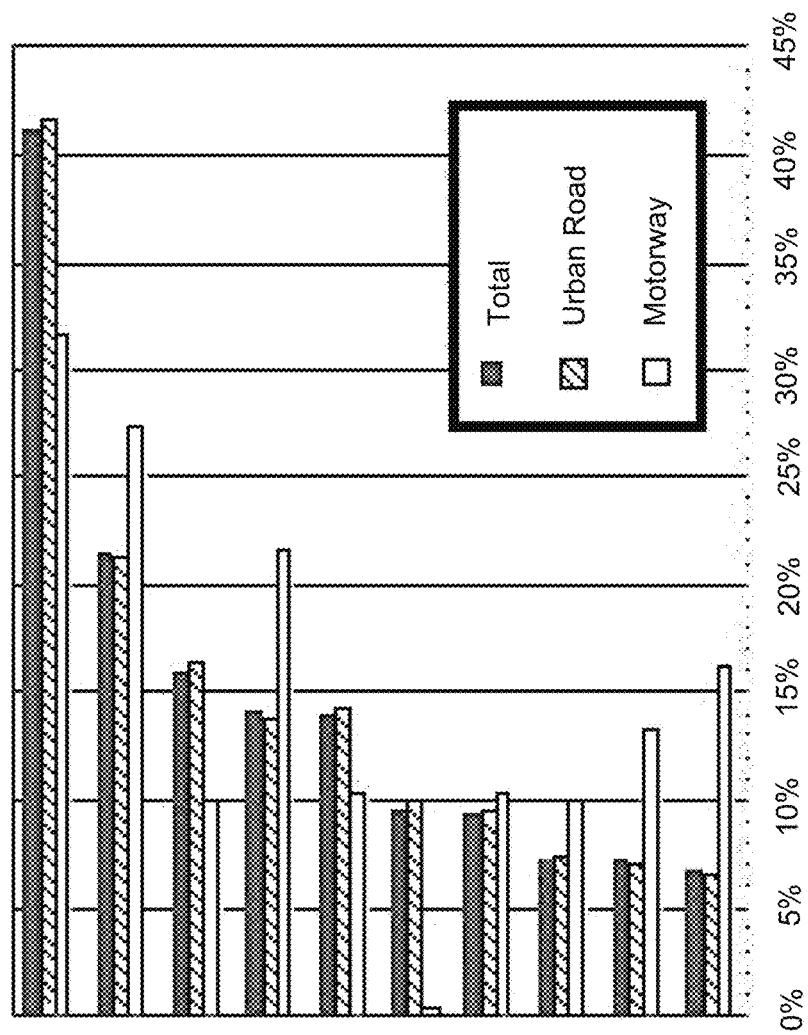
FIG. 10 shows a block diagram schematically illustrating the extent to which factors contribute to accidents in percent (on exemplary 10 main clusters), wherein the x-axis gives the percentage of the contribution of the respective factors in percentage for the accident. Note, that the percentages do not add up to 100% as an accident can have more than one contributory factors.

The automated resource pooling systems 101, 121 comprise the first and second payment data store 102, 122 for their operation allowing a secure payment parameter storage of stored first payment parameters 1021, ..., 1025 and stored second payment parameters 1221, ..., 1225, respectively. In FIG. 4, reference numeral 1 refers to the dynamic triggered system for providing optimized risk protection related to risk exposed autonomous or partially autonomous driving motor vehicles 41, ..., 45 with the associated coupled resource pooling systems 101, 121. The resource pooling systems 101, 121 can e.g. be coupled, steered and/or operated by means of the expert-system based or machine-learning based or artificial intelligence based, central automotive circuit 11, provide dynamic self-sufficient risk protection and a corresponding risk protection structure for the variable number of risk exposed autonomous or partially autonomous driving motor vehicles 41, ..., 45; i.e., units exposed to defined risk events, wherein the occurrence of such risk events is measurable and triggerable by means of the on-board sensors and measuring devices 401, ..., 405 and/or appropriate measuring devices and/or trigger modules triggering in the data flow pathway of the automotive control circuit 461, ..., 465 for autonomous motor vehicle driving, i.e. for autonomous steering and controlling of the motor vehicles 41, ..., 45. At least some of the automotive control circuit 461, ..., 465 can comprise secured means for saving processor-driving operation code and flash memory for reading and capturing of the automotive data 3. At least some of the automotive data 3, captured by the automotive control circuit 461, ..., 465, are measured by means of sensors comprising at least an accelerometer to measure the motor vehicle's g-force during acceleration, braking, and cornering and/or global positioning system (GPS) to record location data and to calculate driving distances. It is to be noted that some of the risk factors may only be applicable, if it is not a Level 4 vehicle, i.e. fully autonomous vehicle. The motor vehicles 41, ..., 45 can comprise further parameter measuring devices (cf. above on-board sensors and measuring devices 401, ..., 405, in particular the exteroceptive sensors or measuring devices 4011 and the proprioceptive sensors or measuring devices 4012) as e.g. devices for measuring speed (maximum speed, speeding, time spent in speed bands), breaking (harsh braking, number of brake applications, braking distance), acceleration, cornering, distance (e.g. odometer reading), mileage (e.g. used for pay as you drive or distance based risk pricing), short journey, time of day, road and terrain type, mobile phone usage (while driving), weather/driving conditions, location (GPS, triangulation), temperature, blind spot, local driving, sun angle and dazzling sun information (sun shining in drivers' face), seatbelt status, rush hour use, fatigue (e.g. measured by eye trackers or the like), driver confidence, throttle position, lane changing, fuel consumption (per trip and average fuel economy), quantification data points, Vehicle Identification Numbers (VIN), slalom (no straight line driving), Revolutions Per Minute RPM (excessive RPM, max RPM, time in RPM bands), off road usage, G forces, brake pedal position, driver alertness, Controller Area Network (CAN) bus parameters including fuel level, distance to other vehicles, distance to obstacles, activated/ usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, biometric information or measuring parameters, driver mental and emotional condition, dazzling headlights from other vehicles, vehicle door status (open/closed), visibility through windscreens, lane position, lane choice, vehicle safety, driver's mood, passengers' mood, $CO^2$ emissions (total emissions based on the amount of fuel consumed), Power Take Off (PTO; refers to the activity of any motorized device that is connected to a vehicle), engine hours, oil pressure, water temperature, idle time and/or warm-up idle time. The measurement of the above automotive data by means of the mobile telematics devices 401, . . . , 405 can e.g. be subject to their availability on the vehicle CAN bus, wherein the Controller Area Network bus is a vehicle bus standard designed to allow microcontrollers and devices to communicate with each other in applications without a host computer. It is a message-based protocol, designed for multiplex electrical wiring within automobiles, however, CAN buses are also used in other contexts.

Further, the dynamically triggered automotive system 1 can e.g. include at least one processor and associated memory modules. The expert-system based automotive car system 1 can also include one or more display units and operating elements, such as a keyboard and/or graphic pointing devices, such as a computer mouse. The resource pooling systems 101 and 121 are technical devices comprising electronic means that can be used by service providers in the field of risk transfer or insurance technology for the purpose of risk transfer as it relates to the occurrence of measurable risk events 61, . . . , 63. The invention seeks to capture, handle, automate, and optimize by telematics, related operations of the automated insurance systems 10, 12, in particular in an effort to optimize the interaction of coupled systems 10, 12, and to reduce the operational requirements. Another aspect that is addressed is finding ways to synchronize and adjust such operations related to coupling or mutually activating of resource pooling systems 101, 121, which are directed at proved risk protection of risk exposed units based on technical means. In contrast to the standard practice, the resource pooling systems 101, 121 also achieve reproducible, dynamically adjustable real-time operations based on automotive data with the desired technical, repeating accuracy, because it is completely based on technical means, a process flow and process control/operation.

The dynamically triggered, multi-tier risk-transfer system is provided by means of the expert-system based automotive car system 1 with a plurality of autonomous or partially autonomous driving motor vehicles 41, . . . , 45 connected by means of the automotive control circuits 11 via the mobile telematics devices 411, . . . , 415 associated with a plurality of motor vehicles 41, . . . , 45. The expert-system based automotive car system 1 triggers, signals, and mutually activates a first and second risk-transfer tiers 10/12 providing a self-sufficient risk protection for a variable number of risk exposed motor vehicles 41, . . . , 45 by means of a first and second resource pooling system 101/121. The first and second risk-transfer tiers 10/12 can be realized as coupled, automated first and second insurance systems 10/12. The risk exposure components 21, 22, 23, . . . are connected to the first resource pooling system 101 by means of a plurality of payment transfer modules 103 configured to receive and store 102 first payment parameters 1021, . . . , 1025 by means of the first data store 102 from the risk exposed autonomous or partially autonomous driving motor vehicles 41, . . . , 45, . . . for the pooling of their risk exposures 51, . . . , 55. The first insurance system 10 provides automated risk protection for each of the connected risk exposed motor vehicles 41, . . . , 45 based on received and stored first payment parameters 1021, . . . , 1025. The first insurance system 10 is connected to the second resource pooling system 121 by means of second payment transfer modules 123 configured to receive and store 122 second payment parameters 1221, . . . , 1225 from the first insurance system 10 for adopting of a portion of the risk exposures 5 accumulated by the first insurance system 10. In the case of the occurrence of one of defined risk events 61, . . . , 63 the occurred loss is automatically covered by the first insurance system 10.

The automotive control circuits 461, . . . , 465 associated with the plurality of autonomous or partially autonomous driving motor vehicles 41, . . . , 45 comprising one or more wireless connections 411, . . . , 415, and a plurality of interfaces 421, . . . , 425 for connection with at least one of a vehicle's data transmission bus, and/or a plurality of interfaces for connection with appropriate sensors 4011 and/or measuring devices 4012 and/or speakers 4113 and/or microphones 4114. The sensors and measuring devices can comprise means for capturing various data, as described below. The telematics devices 401, . . . , 405 can e.g. provide the one or more wireless connections 41141, . . . , 41145 by means radio data systems (RDS) modules 41141 and/or positioning system 41142 including a satellite receiving module 41145 and/or a mobile telephone module 41143 and/or a digital radio service module and/or a language unit 41144 bidirectionally connected the radio data system 41141 or the positioning system 40112 or the cellular telephone module 41143. However, as special embodiment variant, the automotive control circuits 461, . . . , 465 can also comprise a wired permanent or periodic connection, e.g. by a periodic data transfer by means of an USB flash drive, as discussed further below. It is to be noted that the periodic data transfer can also be performed by other means than said USB interface. It can, for example, also be a blackbox to which a data cable can be connected, or any type of hard drive or a device, in which storage cards (e.g., Secure Digital (SD) as a non-volatile memory card etc.) can be inserted or the same. The satellite receiving module 41145 can e.g. comprises a Global Positioning System (GPS) circuit 40112 and/or the digital radio service module 41141 can e.g. comprises at least a Global System for Mobile Communications (GSM) unit 41143. For telematics, Radio Data System (RDS) denotes a communications protocol standard for embedding amounts of digital information in conventional Frequency Modulation (FM) radio broadcasts. RDS standardizes several types of information transmitted, including time, station identification and program information. Radio Broadcast Data System (RBDS) is the official name used for the U.S. version of RDS. For the wireless connection 41141, . . . , 41145, the telematics devices 411, . . . , 415 acts as wireless node 221, . . . , 225 within a corresponding data transmission network 2 by means of antenna connections of the telematics device 411, . . . , 415.

On the other side, the automotive control circuit 461, . . . , 465 can be connected to an on-board diagnostic system 431, . . . , 435 and/or an in-car interactive device 441, . . . , 445 and/or a monitoring cellular mobile node application 451, . . . , 455 and/or the mobile telematics devices 411, . . . , 415 may be included as integrated part in a mobile device as a smartphone. Thus, as a variant, the mobile telematics devices 411, . . . , 415 connected to the automotive control circuit 461, . . . , 465 can built an integrated part of a cellular mobile phone. At least some of the automotive control circuit 461, . . . , 465 can e.g. connected to mobile phone applications (smartphone apps) 451, . . . , 455, wherein the associated mobile phone 41143 comprises the mobile telematics devices 411, . . . , 415, as e.g. a global positioning system (GPS) circuit 40112 and/or mobile network triangulation means providing monitoring of travel speed, frequency of travel, location, and driving style), and wherein the mobile phone's network connection are used to transmit the captured automotive data 3 to the central, expert-system based circuit 11. The automotive control circuit 461, . . . , 465, e.g. connected to the on-board diagnostic (OBD) system 431, . . . , 435 may provide an appropriate monitoring of the vehicle's systems and/or subsystems. The connection e.g. to the on-board diagnostic (OBD) system 431, . . . , 435 of the autonomous or partially autonomous driving mobile vehicle 41, . . . , 45 can be provided by plugging in a data transmission wire into an appropriate port of the on-board diagnostic system 431, . . . , 435. As mentioned, the at least some of the automotive control circuit 461, . . . , 465 can also be connected to an in-car interactive device 441, . . . , 445, wherein for example the vehicle's speed and travel distances is monitored by a global positioning system (GPS) circuit 4116 and wherein the automotive data 3 are transmitted form the automotive control circuit 461, . . . , 465 by means of the mobile telematics device 411, . . . , 415 to the central, expert-system based circuit 11 by means of a cellular telecommunication connection. Some of the automotive control circuit 461, . . . , 465 can e.g. comprise speakers and a voice connection from the central, expert-system based circuit 11 and/or the first and/or second risk-transfer system 10/12 to the automotive control circuit 461, . . . , 465 thereby providing real-time services, in particular, coaching-services to the user of the motor vehicle 41, . . . , 45 on their driving usage of the autonomous or partially autonomous driving motor vehicle 41, . . . , 45 and/or other usage-based 31 or user-based 32 behaviors. In summary, the automotive control circuit 461, . . . , 465 can e.g. comprise or be connected to on-board sensors or other measuring devices 401, . . . , 405, in particular exteroceptive and/or proprioceptive sensors or measuring devices 4011/4012, On-Board-Diagnose (OBD) systems or dongle, smartphone and/or mobile cellular phone, windscreen device (as e.g. cameras), black box devices, cigarette lighter adaptor (CLA) device, eCall OBU, embedded OEM devices and/or infotainment system, smartphone projection standards to allow mobile devices running a certain operating system to be operated in automobiles through the dashboard's head unit (examples may include Apple Carplay, Mirrorlink, Android Auto), on-board navigation systems, navigation devices, Aftermarket Advanced Driver Assistance Systems (examples may include Mobileye), Embedded Advanced Driver Assistance Systems (examples may include Advanced emergency braking systems, Lane Departure Warning systems, Parking Assist features), vehicular automation systems (examples may include Autopilot systems, Remote Valet Parking Assistant or Autonomous Parking Assistant), smartwatches and other wearable. The automotive control circuit 461, . . . , 465 may also comprise specific combined features of the above mentioned devices as e.g. smartphone (App) with beacon or Bluetooth Low Energy (BLE) beacon (BLE, also known as Bluetooth Smart) is a wireless personal area network technology mainly designed for novel applications in the healthcare, fitness, security, and home entertainment industries. Compared to the classic Bluetooth, Bluetooth Smart is intended to provide considerably reduced power consumption and cost while maintaining a similar communication range (around 10 m), smartphone with OBD dongle or BLE enabled OBD dongle, smartphone only, self-installable aftermarket black box, professionally-installed aftermarket black box, aftermarket black-box & display In this way, the automotive control circuit 461, . . . , 465 capture usage-based 31 and/or user-based 32 and/or operational 33 automotive data 3 of the autonomous or partially autonomous driving motor vehicle 41, . . . , 45 and/or the automotive control circuit 461, . . . , 465 and/or user 321, 322, 323, and transfer them over the data transmission network 2 to the expert-system based automotive car circuit 11. In particular, the plurality of automotive control circuits 461, . . . , 465 associated with the autonomous or partially autonomous driving motor vehicles 41, . . . , 45 are connected to said expert-system based automotive car circuit 11, wherein a data link 21 is set by means of the wireless connection 411, . . . , 415 between the expert-system based automotive car circuit 11 transmitting at least the captured usage-based 31 and/or user-based 32 and/or operational 33 automotive data 3 from the automotive control circuits 461, . . . , 465 by means of the mobile telematics devices 411, . . . , 415 to the expert-system based automotive circuit 11. At least some of the mobile telematics devices 411, . . . , 415 can e.g. comprise a cellular modem 4113 to transmit the automotive data 3 form the mobile telematics device 401, . . . , 405 to the automotive control circuits 461, . . . , 465. However, as a special embodiment variant, the mobile telematics devices 411, . . . , 415 associated with the plurality of motor vehicles 41, . . . , 45 do not comprise a wireless connections 4114, but transmit the automotive data 3 e.g. by being connected on a periodical basis to a wired (fixed) network, as e.g. a Local Area Network (LAN), or by being connected to a data transmission or network station, as e.g. a personal computer, via a Universal Serial Bus (USB) or an intermediate USB devices or USB computer peripherals as an USB flash drive or other portable data storage device. The plurality of interfaces 421, . . . , 425 for connection with at least one of a motor vehicle's data transmission bus can e.g. comprise at least on interface for connection with a motor vehicle's Controller Area Network (CAN) bus.

As described above, the expert-system based automotive car system 1 comprises one or more first risk-transfer systems 10 to provide a first risk-transfer based on first risk transfer parameters 501, . . . , 505 from at least some of the autonomous driving motor vehicles 41, . . . , 45 to the first risk-transfer system 10, wherein the first risk-transfer system 10 comprises a plurality of payment transfer modules 103 configured to receive and store 102 first payment parameters 1021, . . . , 1025 associated with risk-transfer of risk exposures 5 of said autonomous or partially autonomous driving motor vehicles 41, . . . , 45 for pooling of their risks 51, . . . , 55. By means of the central, expert-system based circuit 11 of the automotive car system 1 risk-related automotive data 3, captured from the automotive control circuits 461, . . . , 465 via the mobile telematics devices 401, . . . , 405, are processed, wherein first risk transfer parameters 501, . . . , 505 and correlated first payment transfer parameters 1021, . . . , 1025 are generated by means of the machine-learning based telematics circuit 11 and transmitted to the first risk-transfer system 10. In the case of triggering the occurrence of one of defined risk events 61, . . . , 63 associated with transferred risk exposure 51, . . . , 55 of the motor vehicles 41, . . . , 45, the occurred loss 71, . . . , 75 is automatically covered by the first risk-transfer system 10 based on the first risk transfer parameters 501, . . . , 505 and correlated first payment transfer parameters 1021, . . . , 1025.

Further, the expert-system based automotive car system 1 comprises a second risk-transfer system 12 to provide a second risk-transfer based on second risk-transfer parameters 511, . . . , 515 from one or more of the first risk-transfer systems 10 to the second risk-transfer system 12, wherein the second risk-transfer system 12 comprises second payment transfer modules 123 configured to receive and store 122 second payment parameters 1221, ..., 1225 for pooling of the risks of the first risk-transfer systems 10 associated with risk exposures transferred to the first risk-transfer systems 10. For the operation of the second risk-transfer system 12, second risk transfer parameters 511, ..., 515 and correlated second payment transfer parameters 1221, ..., 1225 are generated by means of the central, expert-system based circuit 11 and transmitted to the second risk-transfer system 12, wherein, in the case of triggering the exceedance of a defined activation threshold parameter 124 associated with the occurrence of the defined risk events 61, ..., 63, the occurred loss 71, ..., 75 is at least partly covered by the second insurance system 12 based on the second risk transfer parameters 511, ..., 515 and correlated second payment transfer parameters 1221, ..., 1225. For example, in the case of triggering the exceedance of the defined activation threshold parameter 124, the second risk-transfer system 12 is automatically activated by transferring activation signaling by means of the system 1 to the second insurance system 12 covering, upon activation, said adopted portion of risk exposures 51, ..., 55 accumulated by the first insurance system 10. However, it is explicitly to be mentioned, that the present invention, as embodiment variant can be realized with a fixed activation, i.e. without triggering an activation threshold. Thus, the present invention can be realized with a proportional or a non-proportional risk-transfer as coupling mechanism between the first and second risk-transfer systems 10/12, wherein under proportional risk-transfer coupling, the second risk-transfer system 12 is activated by means of the switching device 11 by a fixed percentage share of each risk transferred to the first risk-transfer system 10. Accordingly, the second risk-transfer system 12 receives that fixed payment transfer from the first risk-transfer system 10 by means of the second payment parameters 1221, ..., 1225. Under non-proportional risk-transfer coupling, the in the case of triggering the exceedance of a defined activation threshold parameter 124 associated with the occurrence of the defined risk events 61, ..., 63, the occurred loss 71, ..., 75 is at least partly covered by the second insurance system 12 based on the second risk transfer parameters 511, ..., 515 and correlated second payment transfer parameters 1221, ..., 1225. The activation threshold can be associated with each single loss occurred or on the accumulated loss measured by means of the aggregated loss parameter 80. Thus, the non-proportional coupling can be realized in an excess of loss or stop loss risk-transfer structure, wherein the excess of loss structure can e.g. be based on a Per Risk XL (Working XL), Per Occurrence/Per Event XL (Catastrophe or Cat XL), or Aggregate XL structure. The first and second risk transfer parameters 501, ..., 505/511, ..., 515 and the correlated first and second payment transfer parameters 1021, ..., 1025/1221, ..., 1225 are dynamically adapted and/or mutually optimized by means of the machine-learning based telematics circuit 11 based on the captured usage-based 31 and/or user-based 32 and/or operational 33 automotive data 3 from the mobile telematics devices 401, ..., 405 associated with the plurality of motor vehicles 41, ..., 45 and based on the pooled risks 5 of the first risk transfer systems 10. The machine-learning based telematics circuit 11 can comprises, for example, an aggregation module providing the risk exposure 51, ..., 55 for one or a plurality of the pooled risk exposed motor vehicles 41, ..., 45 based on the captured risk-related automotive data 3, wherein the first and second risk transfer parameters 501, ..., 505/511, ..., 515 and the correlated first and second payment transfer parameters 1021, ..., 1025/1221, ..., 1225 are dynamically generated based on the likelihood of the occurrence of the predefined risk events (61, ..., 63) of the pooled autonomous or partially autonomous driving motor vehicles 41, ..., 45.

Concerning the non-proportional coupling of the first and second risk-transfer systems 10/12 of the system 1 by means of the switching device 117 of the central, automotive circuit 11, the mentioned aggregation module 114 of the automotive car system 1 can e.g. automatically aggregate the captured loss parameters 80 of measured occurrence of risk events 61, ..., 63 over all risk exposed autonomous or partially autonomous driving motor vehicles 41, ..., 45 increments an associated stored aggregated loss parameter 81 within a predefined time period 1141 and automatically aggregates 81 the received and stored first payment parameters 1021, ..., 1025 overall risk exposure components 41, ..., 45 within the predefined time period 1141 by incrementing an associated stored, aggregated payment parameter 81, wherein the variable loss ratio parameter 82 dynamically is generated based upon the ratio of the aggregated loss parameter 80 and the aggregated payment parameter 81, and wherein the first and second risk transfer parameters 501, ..., 505/511, ..., 515 and the correlated first and second payment transfer parameters 1021, ..., 1025/1221, ..., 1225 are dynamically generated based on the likelihood of the occurrence of the predefined risk events 61, ..., 63 of the pooled motor vehicles 41, ..., 45 and the variable loss ratio parameter 82. As an embodiment variant, in case of triggering the variable loss ratio parameter 82 exceeding a loss ratio threshold value 821, the first and second risk transfer parameters 501, ..., 505/511, ..., 515 and the correlated first and second payment transfer parameters 1021, ..., 1025/1221, ..., 1225 are dynamically adapted and/or optimized based on the likelihood of the occurrence of the predefined risk events 61, ..., 63 of the pooled motor vehicles 41, ..., 45) and the variable loss ratio parameter 82. The triggering of the exceedance of the defined the activation threshold parameter 124 can e.g. be associated with triggered value of the accumulated occurrence of measured risk events 61, ..., 63. In all cases, the switching device 117 of the central, expert-system based automotive circuit 11 generates all necessary signaling and transmits the signaling to the first and second risk-transfer system 10/12 to electronically perform the switching.

As another embodiment variant, the risk exposed motor vehicles 41, ..., 45 can e.g. be connected to the first risk-transfer system 10 transferring risk exposure 51, ..., 55 associated with the occurrence of defined risk events 61, ..., 63 from the risk exposed autonomous or partially autonomous driving motor vehicle 41, ..., 45 to the risk-transfer insurance system 10 by means of dynamically adapted and/or optimized first risk transfer parameters 501, ..., 505 and correlated dynamically aligned first payment transfer parameters 1021, ..., 1025, wherein the first risk-transfer system 10 is connected to the second insurance system 12 by transferring risk exposure 5 associated with the occurrence of the defined risk events 61, ..., 63 from the first risk-transfer system 10 to the second risk-transfer system 12 by means of dynamically adapted and optimized second risk transfer parameters 511, ..., 515 and correlated dynamically aligned second payment transfer parameters 1221, ..., 1225, and wherein, in the case of the occurrence of one of the defined risk events 61, ..., 63, loss parameters 711, ..., 715/721, ..., 725/731, ..., 735 measuring the loss 71, ..., 75 at the risk exposed autonomous or partially autonomous driving motor vehicles 41, ..., 45 are captured and transmitted to the first insurance system 10, and wherein the occurred loss 71, ..., 75 is automatically covered by the first insurance system 10 based on the optimized first risk transfer parameters 501, ..., 505. In another variant, a loss 71, ..., 75 associated with a predefined risk event 61, ..., 63 and allocated to a pooled risk exposed motor vehicles 41, ..., 45 can e.g. be distinctly covered by the automated resource pooling systems 101 of the first risk-transfer system 10 via a transfer of payments from the first resource pooling system 101 to said risk exposed motor vehicle 41, ..., 45, wherein a second payment transfer from an automated second resource pooling system 121 of the second risk-transfer system 12 to the first resource pooling system 101 is triggered via the generated activation signal based on the measured actual loss 711, ..., 715/721, ..., 725/731, ..., 735 of the risk exposed autonomous motor vehicle 41, ..., 45 by the automotive car system 1. Otherwise, the loss 71, ..., 75 corresponding to the risk transferred to the second risk-transfer system 12 can also be directly covered by the second resource pooling system 121 through the transfer of resources from the second resource pooling system 121 to the concerned risk exposed motor vehicle 41, ..., 45 via the second payment transfer module 123.

To provide an even more dynamic reaction and adaptability of the system 1, the central, expert-system based circuit 11 of the automotive car system 1 can e.g. comprise means for processing risk-related automotive data 3 and for providing the likelihood of the occurrence of the predefined risk events 61, ..., 63 of the pooled autonomous or partially autonomous driving motor vehicles 41, ..., 45 based on risk-related automotive data 3, and wherein receipt and preconditioned storage 102 of payments 1021, ..., 1025 from the risk exposed motor vehicles 41, ..., 45 for the pooling of their risks can dynamically, in particular in real-time, be determined based on total risk 5 and/or the likelihood of the occurrence of the predefined risk events 61, ..., 63 of the pooled motor vehicles 41, ..., 45. Further, the risk-related automotive data 3 can e.g. be processed by means of the machine-learning based circuit 11 and the likelihood of the occurrence of the predefined risk events 61, ..., 63 of the pooled autonomous or partially autonomous driving motor vehicles 41, ..., 45 based on the risk-related automotive data 3 is generated, wherein receipt and preconditioned storage 102 of payments 1221, ..., 1225 from first resource pooling system 101 to the second resource pooling system 121 for the transfer of its risk can be dynamically determined based on total risk 5 and/or the likelihood of the occurrence of the predefined risk events 61, ..., 63 of the pooled motor vehicles 41, ..., 45. In particular, the number of pooled risk exposed motor vehicles 41, ..., 45 can e.g. dynamically and/or in real-time be adapted via the first insurance system 10 by means of the expert-system based circuit 11 to a range where non-covariant occurring risks covered by the risk-transfer system 10 affect only a relatively small proportion of the total pooled risk exposed autonomous or partially autonomous driving motor vehicles 41, ..., 45 at any given time. The risk transfer from the first risk-transfer system 10 can also be dynamically adapted via the second risk-transfer system 12 by means of the expert-system based, automotive circuit 11 to a range where non-covariant occurring risks covered by the second risk-transfer system 12 affect only a relatively small proportion of the total risk transferred from the first risk-transfer system 10 at any given time. In addition, the first and second risk transfer parameters 501, ..., 505/511, ..., 515 and the correlated first and second payment transfer parameters 1021, ..., 1025/1221, ..., 1225 can e.g. be dynamically adapted by means of the machine-learning based circuit 11 based on time-correlated incidence data for one or a plurality of risk events 61, ..., 63. Finally, upon each triggering of an occurrence of captured automotive data 3 or (or based upon the) parameters 611, ..., 613/621, ..., 623/631, ..., 633 indicating a risk event 61, ..., 63 by means of the machine-learning based circuit 11, a total parametric payment is allocated with the triggering, wherein the total allocated payment is transferable when the occurrence has been triggered to the corresponding pooled risk exposed motor vehicle 41, ..., 45 affected by the measured occurrence of said risk event 61, ..., 63.

The system 1 can e.g. be fully automated, in that, in the case of the occurrence of one of defined risk events 61, ..., 63, loss parameters 711, ..., 715/721, ..., 725/731, ..., 735 measuring the loss at the risk exposed autonomous or partially autonomous driving motor vehicles 41, ..., 45 are automatically captured and transmitted to the first insurance system 10, and wherein the occurred loss 71, ..., 75 is automatically covered by the first insurance system 10. Further, the payment transfer can automatically be triggered and monitored, thereby influencing the operation of the system 1. For example, the system 1 can comprise a control device 1231 capturing each payment transfer from the first risk-transfer system 10 to the second payment transfer module 123, wherein the second risk-transfer system 12 of the system 1 is only activatable by triggering a payment transfer matching a predefined activation control parameter 1232.

For the dynamically adapted and/or dynamically optimized signaling of the first and second risk transfer parameters 501, ..., 505/511, ..., 515 and the correlated first and second payment transfer parameters 1021, ..., 1025/1221, ..., 1225, the machine-learning based circuit 11 comprises a score driving module 111 triggering and automatically selecting score driving parameters 1111, ..., 1113 based on defined score driving behavior pattern 1121, ..., 1123 by comparing captured automotive data 3 with the defined score driving behavior pattern 1121, ..., 1123. The data components of the score can inter alia comprise customer policy details, individual driving data, crash forensics data, credit scores, statistical driving data, historic claims data, market databases, driving license points (if not fully automated), statistical claims data, context data of weather conditions, context data of road types and/or context data of surroundings, and operational safety and stability of the automotive control circuit 461, ..., 465. The scores can e.g. comprise driving score, aggregated score, pricing algorithms, automated vehicle safety features, usage and operation of Advanced Driver Assistance Systems, and/or usage and operation of Autonomous Vehicle systems etc. The score driving module 111 provides automated real-time capturing score risks 61, ..., 63 according to the measured location or trip of the autonomous or partially autonomous driving motor vehicle 41, ..., 45 based on the captured automotive data 3 of the autonomous control circuits 461, ..., 465 associated with the motor vehicles 41, ..., 45. This allows for real-time adaption of the first and second risk transfer parameters 501, ..., 505/511, ..., 515 and the correlated first and second payment transfer parameters 1021, ..., 1025/1221, ..., 1225 according to the actual measured risks of the autonomous or partially autonomous driving motor vehicles 41, ..., 45. The automotive car system 1 can comprise means for contextual data processing to improve telematics scoring. This allows the system 1 to compare automotive data (location, speed, acceleration, deceleration)

to the context and surrounding (e.g. weather, road types, surrounding, traffic, accidents ahead, road infrastructure, crossings, junctions, dangerous points, traffic rules, road safety classifications, driving behavior of other drivers, estimated likelihood of accidents on trip roadways, position and/or behavior of surrounding vehicles). Further, it is a concept that enables using smartphone data more reliably to score risk. An example of contextual data is the vehicle speed compared to maximum allowed speed and/or weather conditions. Driving too fast may not be as much of a risk if surrounding vehicles adopt a similar speed. However, driving at the maximum allowed speed in bad weather conditions (e.g., fog) may present dangerous driving behavior. The score driving module 111 further allows to capture and control the score driving behavior, and compare its behavior within the technical operation and context. It allows to automatically capture scores risks according to location or trip, and to automatically analyze and react on data related to the need of value added services, as e.g. accident notifications and/or feedback to the driver and/or automated fleet risk reporting and/or automated and dynamically optimized underwriting etc.). The telematics based feedback means of the system may e.g. comprise a dynamic alert feed via a data link to the motor vehicle's control circuit 461, . . . , 465 via the mobile telematics device 411, . . . , 415, wherein the the expert-system based automotive circuit 11 heads up device alerts drivers 4115 immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. Clearly, even the most experienced drivers can benefit from having their driving behavior dynamically analyzed and improved. The automotive car system 1 provides the opportunities for improvement dynamically and in real-time, i.e. as and when they happen, related to the driver's risk behavior. Providing instant feedback to drivers through heads up training aids and get information sent straight to the automotive control circuit 461, . . . , 465, ensures, in case of not fully automated motor vehicles 41, . . . , 45 a two pronged approach to correcting risky (and often expensive) driving habits. Thus, the automotive car system 1 not only allows to mutually optimize the operational parameters 1021, . . . , 1025/1221, . . . , 1225/ 501, . . . , 505/511, . . . , 515 of the first and second risk transfer system 10/12, but also optimize the risk and/or risk behavior on the level of the risk exposed motor vehicles 41, . . . , 45. No prior art system allows such an integral, real-time optimization. As another value added service, the automotive car system 1 can e.g. dynamically generated fleet risk reports of selected autonomous or partially autonomous motor vehicles 41, . . . , 45. Such fleet reports automated generated by the automotive car system 1 provide a new approach to share and compare driver statistics. Additional advantages follow as a direct effect of such reports, as automated reward generation of top performers or identification of drivers who need extra training, etc.

Further, the occurred and triggered losses 71, . . . , 75 can e.g. be automatically aggregated by means of captured loss parameters 711, . . . , 715/721, . . . , 725/731, . . . , 735 of the measured occurrence of risk events 61, . . . , 63 over all risk exposed autonomous or partially autonomous driving motor vehicles 41, . . . , 45 within a predefined time period 1141) by incrementing an associated stored aggregated loss parameter (80) and for automatically aggregating 81 the received and stored first payment parameters 1021, . . . , 1025 over all risk exposed vehicles 41, . . . , 45 within the predefined time period 1141 by incrementing an associated stored, aggregated payment parameter 81, and wherein the variable first and second risk transfer parameters 501, . . . , 505/511, . . . , 515 and the correlated first and second payment transfer parameters 1021, . . . , 1025/1221, . . . , 1225 dynamically are generated based upon the ratio of the aggregated loss parameter (80) and the aggregated payment parameter 81. In summary, the first and second risk-transfer system 10/12 can be automatically steered, triggered, signaled, and mutually activated based on the dynamic-adaptable first and second risk transfer parameters 501, . . . , 505/511, . . . , 515 and the correlated first and second payment transfer parameters 1021, . . . , 1025/1221, . . . , 1225 by means of the machine-learning based circuit 11, providing a self-sufficient risk protection for the variable number of motor vehicles 41, . . . , 45 associated with the mobile telematics devices 401, . . . , 405 by means of the coupled first and second insurance system 10/12.

In addition to the triggered payment transfers, the machine-learning based circuit 11 can e.g. comprise additional triggers 112/113 triggering accident notifications and/or feedback to the driver and/or automated fleet risk reporting and/or automated and dynamically optimized underwriting and/or other added services based on the captured automotive data 3 of the mobile telematics devices 401, . . . , 405 associated with the autonomous or partially autonomous driving motor vehicles 41, . . . , 45. This is already described in detail above.

As indicated in FIG. 4, the dynamically triggered system 1 includes the first and second data store or storing module 102, 122 for capturing the risk-related component data and multiple functional-based modules; e.g., the payment transfer modules 103 and 123, the triggers 111, . . . , 113, or the aggregation module 114. The functional modules can be implemented at least partly as programmed software modules stored on a computer readable medium, connected in a fixed or removable manner to the processors of the dynamically triggered system 1 or the associated automated systems 10, 12. However, the functional modules may also be realized fully by means of hardware components, units and/or appropriately implemented modules. As illustrated in FIG. 1, the dynamically triggered system 1 and its components, in particular the first and second resource pooling systems 101, 121, the central, expert-system based circuit 11, the trigger 111, . . . , 113, the measuring devices 401, . . . , 405, with the data transfer interfaces 421, . . . , 425, the aggregation module 114, and the payment transfer modules 103, 123, can be connected by means of appropriate communication means, in particular the mobile telematics devices 411, . . . , 415, via a network 2, such as a telecommunications network or any other data transmission network. The network 2 can include a hard-wired or wireless network; e.g., the Internet, a GSM network Global System for Mobile Communication, a UMTS network Universal Mobile Telecommunications System and/or a WLAN Wireless Local Region Network, and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource pooling systems 101, 121 furthermore comprise all of the necessary technical means for electronic money transfer and link-up association; e.g., as initiated by one or more associated payment transfer modules 103, 123 via an electronic network. The monetary parameters can be based on any possible electronic and transfer means, such as e-currency, e-money, electronic cash, electronic currency, digital money, digital cash, digital currency, or cyber currency, or crypto currency, or blockchain database as an example of a sequential transaction database (ledger) in the case of blockchain found in cryptocurrencies derived from bitcoin, etc., which can only be exchanged electronically. The first and second payment data stores 102/122 provide the means for associating and storing monetary parameters associated with a single one of the pooled risk exposed autonomous or partially autonomous driving motor vehicles components 41, . . . , 45. The present invention can involve the use of the aforementioned networks, such as computer networks or telecommunication networks, and/or the Internet and digital stored value systems. Electronic funds transfer EFT, direct deposit, digital gold currency and virtual currency are further examples of electronic money modalities. Also, transfers can involve technologies such as financial cryptography and technologies for enabling such transfers. For the transaction of the monetary parameters, it is preferable to use hard electronic currency, without the technical possibilities for disputing or reversing charges. The resource pooling systems 101, 121 for example support non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the systems 10, 12. This means that using hard electronic currency is rather akin to a cash transaction. However, it is also conceivable to use soft electronic currency, such as currency that allows for the reversal of payments, for example having a "clearing time" of 72 hours, or the like. The electronic monetary parameter exchange method applies to all connected systems and modules related to the resource pooling systems 101, 121 of the present invention, such as the first and second payment transfer modules 103, 123. The monetary parameter transfer to the first and second resource pooling system 101, 121 can be initiated by the payment transfer module 103 and 123, respectively, or upon request by the related resource pooling system 101 or 121.

Further, the system 1 can comprise a core engine comprising the risk event triggers for triggering telematics measuring parameters in the data flow pathway, e.g. of an on-board control system, of the assigned risk exposed autonomous or partially autonomous motor vehicle 41, . . . , 45. The data flow pathway can for example be monitored by the system 1 by means of data communication and interface means, in particular the mobile telematics device 411, . . . , 415, that are connected to a data flow pathway via the interfaces 421, . . . , 425; in particular, it can be monitored by the expert-system based telematics circuit 11 and/or the automotive control circuit 461, . . . , 465, thereby capturing component-related measuring parameters of the data flow pathway at least periodically and/or within predefined time periods. According to one alternative embodiment, the data flow pathway can for example also be dynamically monitored by the dynamically triggered by the system 1, such as by triggering telematics measuring parameters of the data flow pathway that are transmitted from the control circuit 461, . . . , 465 or associated measuring devices and/or systems. By triggering the data flow pathway, which comprises dynamically recorded telematics measuring parameters of the concerned risk exposed motor vehicles 41, . . . , 45, the system 1 is able to detect the occurrence of the predefined risk events 61, . . . , 63 based on predefined trigger parameters. Furthermore, the system 1 can for example also dynamically monitor different stages during the progress of the impact of a risk event 61, . . . , 63 on the risk exposed autonomous or partially autonomous driving motor vehicles 41, . . . , 45 in order to provide appropriately adapted and gradated risk protection for a specific risk exposed motor vehicles 41, . . . , 45. Such a risk protection structure is based on received and stored payments 1021, . . . , 1025 from the related risk exposed motor vehicles 41, . . . , 45 and/or related to the total risk exposure 5 of the risk-transfer system 10, based on the overall transferred risks of all pooled risk exposed motor vehicles 41, . . . , 45.

To generate the dynamically adapted and/or optimized, in particular in real-time adaption, first and second risk transfer parameters 501, . . . , 505/511, . . . , 515 and the correlated first and second payment transfer parameters 1021, . . . , 1025/1221, . . . , 1225 by means of the machine-learning based telematics circuit 11 based on the captured usage-based 31 and/or user-based 32 and/or operational 323 automotive data 3 from the control circuit 461, . . . , 465 associated with the plurality of autonomous or partially autonomous driving motor vehicles 41, . . . , 45, the system 1 comprises a machine-learning based expert device, i.e. the expert-system based automotive circuit 11. The expert-system or machine-learning structure can be dynamically realized by a dynamically reacting realization of the central, automotive circuit 11. However, the expert-system based or machine-learning structure may also be fixed in the system 1, whereas the machine-learning operation is performed by external expert systems or the external expert knowledge, whereas the operation of the system 1 follows fixed data-processing steps. I.e. in this embodiment variant, the system 1 itself is not machine-learning based. Though, the present invention aims at an expert-system based automotive car system, the invention can also be applied to normal telematics circuits/systems (e.g. based on human-developed algorithms) as well.

The give an example for the location-depended determination of the risk of an autonomous or partially autonomous driving motor vehicle 41, . . . , 45, the system 1 can e.g. comprise an automated extended database 116 comprising location-depended data. By means of the database 116, the central, expert-system based, automotive circuit 11 is e.g. enabled to provide an automated location-dependent forecasting of absolute and relative risks e.g. for car accidents based on the captured automotive data 3, especially the captured usage-based 31 and/or user-based 32 and/or operational 33 data. By means of the central, automotive circuit 11, data records of accident events are generated and location-dependent probability values for specific accident conditions associated with the risk of car accident are determined. A spatial high-resolution grid 20 with grid cells 201, . . . , 203 is generated over a geographical area 2 of interest by means of the automotive circuit 11, as illustrated by FIG. 1. The grid cells 201, . . . , 203 can e.g. be associated with the cells of a cellular mobile network 2. The geographical area, e.g. covered by the cellular mobile network 2, includes at least a portion of the autonomous or partially autonomous driving motor vehicles 41, . . . , 45 exposed to risks, e.g. accident risks. The grid cells 201, . . . , 203 of the grid 20 are selectable and data are assignable via the automotive car system 1 by means of the database 116 to each cell 201, . . . , 203 of the grid 20, and data records representative of a grid cell are assigned to a year of occurrence or measurement and are saved in a memory module of the automotive circuit 11. The generation of the location and resolution of datasets is illustrated by the arrows from the database 116 to the grid cells 201, . . . , 203 in FIG. 1. This figure shows an exemplary data extraction and grid generation. The resolution can be adapted to dynamic triggered levels, e.g. cellular network grid cells 20 or municipality or district grids (e.g. 4*4, 10*10, 15*15 km grids). An appropriate quadtree can be generated by means of the automotive car system 1 and associated with the processing steps by the system 1 from associated population density parameters. For each grid cell 201, . . . , 203, an ambient population density parameter can be captured by means of the system 1 and assigned to a generated data record assigned to the corresponding grid cells 201, . . . , 203. Population density parameters can be captured for the geographical area 2 of interest and customized weighting factors can be assigned in said spatial high-resolution grid 20 accounting for the diverse patterns. The population density parameter can for example be extracted by means of the system 1 from aerial high-resolution data, for instance comprising aerial images and/or aerophotos. In general, for the use of aerial high-resolution data of the present invention, the aerial high-resolution data can comprise aerial images and/or aerophotos measured by satellite and/or aircraft and/or aerostat or other measuring stations equipped with a balloon. The extraction of the population density parameters can be based on measured interaction between population density parameters and/or land use parameters and driving or traffic patterns. To perform the extraction using the system 1, the system 1 can comprise variables that measure the interaction of land use and travel behavior, i.e., traffic patterns. However, for the extraction, population density is the primary quantifiable land use descriptor variable. Population density parameters can be further used by the system 1 to isolate area types (urban, second city, suburban, town and rural). Other variables that can relate to quantifying land use, including residential density and work tract employment density parameters, can also be comprised by the system 1. Further parameters and characteristics of the population or built environment such as race, age, income, and retail employment can further be used to weight land use impacts across different population groups. For the extraction, greater population density can for example be associated with decreasing annual miles driven, greater bus availability, decreased dependency on single occupancy vehicles and increased use of transit. The private automobile is still the dominant mode of travel for most geographical areas 2, although dependent on the social or ethnological background, in some geographical areas other modes of transportation are in general more likely to be use. Increasing population density is typically associated with fewer person trips, fewer person miles traveled, and fewer person miles per trip. Residents of densely populated areas report the fewest vehicle trips, vehicle miles traveled, and vehicle miles per trip. Less densely populated areas tend to have more drivers per adult and more vehicles per adult. For the determination of the customized weighting factors, the cities tend to follow national averages with regard to several transportation parameters, for example, drivers per adult, vehicles per adult, percentage of persons working from home, and auto-dependency. Approximately 20% of smaller city residents go to work by a mode other than private automobile. Residents of smaller cities report the highest number of person trips of any area type. Persons in suburban areas make the next highest number of person trips. Typically, a high number of low-income residents live in second cities, which have limited transit availability. For the extraction, the automotive car system 1 can for example also identify locational preferences of specific segments of the population. High-income households generally tend to be located in suburban areas, while middle-income households are most often found in rural areas. Low-income households are generally found in urban or rural areas. Distance to work and travel time to work decrease as the percentage of retail trade in an area increases. Urban areas have the smallest percentage of residents working in census tracts with over 25% participation in retail trade. Smaller cities have the highest percentage with 28.8% of residents working, where more than 25% of jobs are in retail trade. Retail employment and employment density at the work census tract have some measurable correlations to travel behavior. At the home block group, increasing housing density is associated with greater transit availability and closer proximity to transit. Bicycle and walking trips increase as residential density increases. Increasing residential density is also associated with increasing employment density. At residential densities between 100 and 1,499 housing units per square mile, people are less likely to work at jobs with no fixed workplace. Low residential density areas have the largest percentage of people working at home. Thus, in summary, residential density parameters, retail employment, income, area type, and population density parameters all provide important descriptors or drivers for transportation behavior and policy implementation and are related to linking land use to transportation choices and behavior, wherein the data extraction by the system 1 for the ambient population density parameter and the customized weighting factors is based upon said measured variables. Note, that both the travel demand and supply characteristics of urban areas clearly differ from those of highways. Therefore, an analysis of highway traffic patterns and associated dynamics cannot be directly translated to the urban situation. One difference between urban traffic and highway traffic is that on the urban road network, multiple traffic modes coexist and interact, for instance pedestrians, bicycles, cars, buses, trucks, whereas highways are mainly used by cars and trucks.

The above example shows the machine-learning structure based on the location-specific traffic behavior. Analogously, the other captured automotive data 3 are processed by the central, expert-system based circuit 11 providing their appropriately weighted risk-contribution. For each of the various risk contributions, the database 115 comprise historical data allowing to extract and generate the weighted risk contributions.

Finally, it is important to note that the present invention relates to an automotive based risk-transfer system 1 with autonomous driving control circuits 461, . . . , 465 connected to mobile telematics devices 411, . . . , 415 associated with a plurality of autonomous or partially autonomous driving motor vehicles 41, . . . , 45. However, the invention can be applied to a telematics based risk-transfer system for connected motor vehicles, as e.g. cars, connected homes, connected factories, connected offices, and/or connected health/ life by means of telematics devices 411, . . . , 415.

The invention claimed is:
1. An automotive car system, comprising:
a plurality of autonomous or partially autonomous driving motor vehicles, including:
exteroceptive sensors or measuring devices configured to sense environmental parameters, the environmental parameters including at least distances to objects, intensity of an ambient light, or sound amplitude;
proprioceptive sensors or measuring devices configured to sense operating parameters of the motor vehicles, the operating parameters including at least a motor speed, wheel load, heading, or battery status of the motor vehicles;

automotive control systems configured to identifying appropriate navigation paths, obstacles, or relevant signage by interpreting sensory data of the exteroceptive and proprioceptive sensors or measuring devices; and telematics devices with one or more wireless connections or wired connections between the automotive control systems and an external system, the telematics devices having a plurality of interlaces for connection with at least one of a vehicle's data transmission bus or a plurality of interfaces for connection with the exteroceptive and proprioceptive sensors or measuring devices;

a first risk-transfer system configured to provide a first risk-transfer based on first risk transfer parameters from at least some of the motor vehicles to the first risk-transfer system, the first risk-transfer system including a plurality of payment transfer modules configured to receive and store first payment parameters associated with risk-transfer of risk exposures of the motor vehicles for pooling of risks of the motor vehicles; and a second risk-transfer system configured to provide a second risk-transfer based on second risk-transfer parameters from the first risk-transfer system to the second risk-transfer system, the second risk-transfer system including second payment transfer modules configured to receive and store second payment parameters associated with risk exposures transferred to the first risk-transfer systems for pooling of risks of the first risk-transfer system, wherein the autonomous or partially autonomous driving motor vehicles or the automotive control systems are connected to a central, expert-system based circuit through the telematics devices, a data link between the central, expert-system based circuit and the motor vehicles being based on the wireless connections, the motor vehicles transmitting at least usage-based, user-based, or operational automotive data via the telematics devices to the central, expert-system based circuit, the usage-based, user-based, or operational automotive data being based on the sensory data of the exteroceptive and proprioceptive sensors or measuring devices or operating parameters of the automotive control systems, risk-related automotive data captured from the transmitted automotive data of the motor vehicles are processed by the central, expert-system based circuit, the first risk transfer parameters and correlated first payment transfer parameters being generated by the central, expert-system based circuit and transmitted to the first risk-transfer system, and, in the case of triggering an occurrence of one of defined risk events associated with the transferred risk exposure of the motor vehicles, occurred loss being automatically covered by the first risk-transfer system based on the first risk transfer parameters and correlated first payment transfer parameters, second risk transfer parameters and correlated second payment transfer parameters are generated by the central, expert-system based circuit and transmitted to the second risk-transfer system, the occurred loss being at least partly covered by the second risk-transfer system based on the second risk transfer parameters and correlated second payment transfer parameters, and the first and second risk transfer parameters and the correlated first and second payment transfer parameters are dynamically adapted or optimized by the central, expert-system based circuit based on the usage-based, user-based, or operational automotive data captured from the plurality of autonomous or partially autonomous driving motor vehicles and based on the pooled risks of the first risk-transfer systems.

2. The automotive car system according to claim 1, wherein at least one of the automotive control systems at least measures a level of automation of car driving or activation of autonomous driving support of a corresponding motor vehicle, and transmits the measured level of automation of the car driving or the activation of autonomous driving support of the corresponding motor vehicle as part of the automotive data via the telematics devices to the central, expert-system based circuit.

3. The automotive car system according to claim 2, wherein the generated first and second risk transfer parameters and correlated first and second payment transfer parameters at least depend on the measured level of automation of the car driving and/or the activation of autonomous driving support of the corresponding motor vehicle.

4. The automotive car system according to claim 3, wherein the first and second risk transfer parameters and correlated first and second payment transfer parameters generated by the central, expert-system based circuit at least depend on the activation of autonomous driving support of the corresponding motor vehicle in relation to contextual or environmental data of the transmitted automotive data, impact of the activation of a specific autonomous driving support to the generated parameters depending on simultaneous measured, time-dependent contextual data of the transmitted automotive data.

5. The automotive car system according to claim 4, wherein said simultaneous measured, time-dependent contextual or environmental data of the transmitted automotive data at least comprise measured weather condition parameters or location coordinate parameters.

6. The automotive car system according to claim 4, wherein a time-dependent contextual score parameter is measured based on the contextual or environmental data of the transmitted automotive data, a car-manufacturer score parameter for each activated autonomous driving support of the specific motor vehicle is determined, the car-manufacturer score parameters are determined based on performance, efficiency, or quality measurements of the activated autonomous driving support of the corresponding motor vehicle, and the first and second risk transfer parameters and correlated first and second payment transfer parameters generated by the central, expert-system based circuit at least depend on the measured contextual score parameters and the car-manufacturer score parameters.

7. The automotive car system according to claim 1, wherein the defined risk events associated with the transferred risk exposure of the motor vehicles at least comprise transferred risk exposure related to liability risk-transfers for damages, losses, or delay in delivery, and the occurred loss is automatically covered by the first risk-transfer system based on the first risk transfer parameters and correlated first payment transfer parameters.

8. The automotive car system according to claim 1, wherein
the central, expert-system based circuit comprises a table including categorization trigger parameters for triggering a predefined level of automation of the motor vehicles applied by the autonomous control systems of the motor vehicles,
the first and second risk transfer parameters and the correlated first or second payment transfer parameters are dynamically adapted or accumulated by the central, expert-system based circuit based on the triggered categorization of the motor vehicles during usage and based upon the usage-based, user-based, or operational automotive data captured from the plurality of motor vehicles.

9. The automotive car system according to claim 1, wherein the exteroceptive sensors or measuring devices comprise at least radar devices for monitoring the surrounding of the motor vehicle, light detection and ranging (LIDAR) devices for monitoring surrounding of the motor vehicle, global positioning systems or vehicle tracking devices for measuring positioning parameters of the motor vehicle, odometrical devices for complementing and improving the positioning parameters measured by the global positioning systems or vehicle tracking devices, computer vision devices or video cameras for monitoring the surrounding of the motor vehicle, or ultrasonic sensors for measuring position of objects close to the motor vehicle.

10. The automotive car system according to claim 1, wherein for providing the wireless connection, at least one of the telematics devices acts as a wireless node within a corresponding data transmission network through antenna connections of the at least one of the telematics devices.

11. The automotive car system according to claim 1, wherein
the autonomous control systems of the motor vehicles for autonomous motor vehicle driving is connected to an on-board diagnostic system, an in-car interactive device, or a monitoring cellular mobile node application, and
the autonomous control systems capture the usage-based, user-based, or operational automotive data of the motor vehicles or user.

12. The automotive car system according to claim 1, wherein
the central, expert-system based circuit comprises an aggregation module providing the risk exposure for one or a plurality of the pooled risk exposed motor vehicles based on the captured risk-related automotive data, and
the first and second risk transfer parameters and the correlated first and second payment transfer parameters are dynamically generated based on likelihood of the occurrence of predefined risk events of the pooled risk exposed motor vehicles.

13. The automotive car system according to claim 1, wherein
occurred and triggered losses are automatically aggregated based on captured loss parameters of a measured occurrence of risk events over all risk exposed motor vehicles within a predefined time period by incrementing an associated stored aggregated loss parameter,
the received and stored first payment parameters over all risk exposed motor vehicles are automatically aggregated within the predefined time period by incrementing an associated stored, aggregated payment parameter, and
the first and second risk transfer parameters and the correlated first and second payment transfer parameters are dynamically generated based upon a ratio of the aggregated loss parameter and the aggregated payment parameter.

14. The automotive car system according to claim 1, wherein the first and second risk-transfer system are automatically steered, triggered, signaled, and mutually activated based on the dynamic-adaptable first and second risk transfer parameters and the correlated first and second payment transfer parameters by the central, expert-system based circuit, providing a self-sufficient risk protection for a variable number of the motor vehicles associated with the telematics devices by the first and second risk transfer systems.

15. The automotive car system according to claim 14, wherein
the first risk-transfer system comprises an automated first resource pooling system,
the second risk-transfer system comprises an automated second resource pooling system,
the risk exposed motor vehicles are connected to the first resource pooling system through the plurality of payment transfer modules configured to receive and store first payments from the risk exposed motor vehicles for the pooling of risk exposures,
the first risk-transfer system provides automated risk protection for each of the connected risk exposed motor vehicles based on the received and stored first payment parameters,
the first risk-transfer system is connected to the second resource pooling system through second payment transfer modules configured to receive and store second payment parameters from the first risk-transfer system for adopting of a portion of the risk exposures accumulated by the first risk-transfer system, and
in the case of the occurrence of one of defined risk events the occurred loss is automatically covered by the automotive car system.

16. The automotive car system according to claim 1, wherein the central, expert-system based circuit comprises a score driving module triggering and automatically selecting scores driving parameters based on defined autonomous scores driving behavior pattern by comparing captured automotive data with the defined autonomous scores driving behavior pattern.

17. The automotive car system according to claim 16, wherein the score driving module automatically captures scores risks according to a measured location or trip of the motor vehicles based on the captured automotive data of the control system for autonomous motor vehicle driving associated with the motor vehicles.

18. The automotive car system according to claim 16, wherein the score driving module automatically captures scores risks according to a measured maintenance and surveillance factor extracted from the automotive data associated with the autonomous driving motor vehicle or the control systems or the use of active safety features.

19. The automotive car system according to claim 1, wherein the central, expert-system based circuit comprises additional triggers triggering accident notification or other added services based on the captured automotive data associated with the motor vehicles.

20. The automotive car system according to claim 1, wherein the telematics devices provide the one or more wireless connections through a radio data system (RDS) module, a positioning system including a satellite receiving module, a mobile telephone including a digital radio service module, or a language unit in communication the radio data system or the positioning system or the cellular telephone module.

21. The automotive car system according to claim 20, wherein
the satellite receiving module comprises a Global Positioning System (GPS) circuit, or
the digital radio service module comprises at least a Global System for Mobile Communications (GSM) unit.

22. The automotive car system according to claim 1, wherein the plurality of interfaces for connection with the at least one of a motor vehicle's data transmission bus comprises at least one interface for connection with a motor vehicle's Controller Area Network (CAN) bus.

23. The automotive car system according to claim 1, wherein at least one of the automotive control systems or at least some of the telematics devices comprise secured storage for saving processor-driving operation code and flash memory for reading and capturing of the automotive data.

24. The automotive car system according to claim 1, wherein at least some of the automotive data are captured by sensors including at least an accelerometer to measure the motor vehicle's g-force during acceleration, braking, and cornering or a global positioning system (GPS) to record location data and to calculate driving distances.

25. The automotive car system according to claim 1, wherein at least some of the telematics devices comprise a cellular modem to transmit the automotive data from the control systems for autonomous motor vehicle driving through the telematics device to the central, expert-system based circuit.

26. The automotive car system according to claim 1, wherein at least one of the automotive control systems is connected to an on-board diagnostic (OBD) system monitoring the vehicle's systems or subsystems.

27. The automotive car system according to claim 26, wherein at least one of the automotive control systems, connected to the on-board diagnostic (OBD) system of the corresponding motor vehicle, is connected by plugging in a data transmission wire into an appropriate port of the on-board diagnostic system.

28. The automotive car system according to claim 1, wherein at least one of the automotive control systems is connected to an in-car interactive device, the vehicle's speed and travel distances being monitored by a global positioning system (GPS) circuit and the automotive data being transmitted via the telematics device to the central, expert-system based circuit through a cellular telecommunication connection.

29. The automotive car system according to claim 1, wherein at least one of the automotive control systems comprises a speaker and a voice connection from the central, expert-system based circuit or the first or second risk-transfer system to the at least one of the automotive control systems thereby providing real-time services to a user of the corresponding motor vehicle on their driving pattern or other usage-based, user-based, or operating parameters.

30. The automotive car system according to claim 1, wherein
at least some of the automotive control systems are connected to mobile phone applications,
an associated mobile phone comprises a global positioning system (GPS) circuit or is configured to perform mobile network triangulation providing monitoring of travel speed, frequency of travel, location, and driving style, and
the mobile phone's network connection is used to transmit the captured automotive data to the central, expert-system based circuit.

31. The automotive car system according to claim 1, wherein, in the case of triggering exceedance of a defined activation threshold parameter, the second risk-transfer system is automatically activated by transferring activation signaling to the second risk-transfer system covering, upon activation, an adopted portion of risk exposures accumulated by the first risk-transfer system.

32. The automotive car system according to claim 1, wherein, in the case of triggering the occurrence of a loss based upon captured loss parameters of measured predefined event, the second risk-transfer system is automatically activated by transferring activation signaling to the second risk-transfer system covering, upon activation, a predefined portion of the occurred loss at the first risk-transfer system.

33. The automotive car system according to claim 1, wherein
an aggregation module of the automotive car system automatically aggregates captured loss parameters of measured occurrence of risk events over all risk exposed,
the motor vehicles increment an associated stored aggregated loss parameter within a predefined time period and automatically aggregates the received and stored first payment parameters over all risk exposure components within the predefined time period by incrementing an associated stored, aggregated payment parameter,
a variable loss ratio parameter is dynamically generated based upon the ratio of the aggregated loss parameter and the aggregated payment parameter, and
the first and second risk transfer parameters and the correlated first and second payment transfer parameters are dynamically generated based on likelihood of the occurrence of predefined risk events of the pooled motor vehicles and the variable loss ratio parameter.

34. The automotive car system according to claim 33, wherein, by triggering the variable loss ratio parameter exceeding a loss ratio threshold value, the first and second risk transfer parameters and the correlated first and second payment transfer parameters are dynamically adapted based on the likelihood of the occurrence of the predefined risk events of the pooled motor vehicles and the variable loss ratio parameter.

35. The automotive car system according to claim 1, wherein the triggering exceedance of a defined activation threshold parameter is associated with triggered value of an accumulated occurrence of measured risk events.

36. The automotive car system according to claim 1, wherein
the risk exposed motor vehicles are connected to the first risk-transfer system transferring risk exposure associated with the occurrence of defined risk events from the risk exposed motor vehicles to a risk-transfer insurance system based on dynamically adapted and optimized first risk transfer parameters and correlated dynamically aligned first payment transfer parameters,
the first risk-transfer system is connected to the second risk-transfer system by transferring risk exposure associated with the occurrence of the defined risk events from the first risk-transfer system to the second risk-transfer system based on dynamically adapted and optimized second risk transfer parameters and correlated dynamically aligned second payment transfer parameters, in the case of the occurrence of one of the defined risk events, loss parameters measuring loss at the risk exposed motor vehicles are captured and transmitted to the first risk-transfer system, and the occurred loss is automatically covered by the first risk-transfer system based on the optimized first risk transfer parameters.

37. The automotive car system according to claim 36, wherein in the case of the occurrence of one of defined risk events, loss parameters measuring the loss at the risk exposed autonomous motor vehicles are automatically captured and transmitted to the first risk-transfer system, and the occurred loss is automatically covered by the first risk-transfer system.

38. The automotive car system according to claim 1, further comprising a control device configured to capture a payment transfer from the first risk-transfer system to the second payment transfer module, wherein the second risk-transfer system of the system is only activatable by triggering a payment transfer matching a predefined activation control parameter.

39. The automotive car system according to claim 1, wherein a loss associated with a predefined risk event and allocated to a pooled risk exposed motor vehicle is distinctly covered by an automated first resource pooling system of the first risk-transfer system via a transfer of payments from the first resource pooling system a corresponding risk exposed motor vehicle, and a second payment transfer from an automated second resource pooling system of the second risk-transfer system to the first resource pooling system is triggered via a generated activation signal based on measured actual loss of the corresponding risk exposed motor vehicle by the automotive car system.

40. The automotive car system according to claim 39, wherein the loss corresponding to the risk transferred to the second risk-transfer system is directly covered by the second resource pooling system through the transfer of resources from the second resource pooling system to the corresponding risk exposed motor vehicle via the second payment transfer module.

41. The automotive car system according to claim 1, wherein said central, expert-system based circuit of the automotive car system is configured to process risk-related automotive data and provide likelihood of the occurrence of predefined risk events of the pooled motor vehicles based on the risk-related automotive data, and receipt and preconditioned storage of payments from the risk exposed motor vehicles for the pooling of the risks of the risk exposed motor vehicles are dynamically determined based on total risk or likelihood of the occurrence of the predefined risk events of the pooled motor vehicles.

42. The automotive car system according to claim 1, wherein risk-related automotive data are processed by the central, expert-system based circuit, likelihood of the occurrence of predefined risk events of the pooled motor vehicles is generated based on the risk-related automotive data, and receipt and preconditioned storage of payments from a first resource pooling system associated with the first risk-transfer system to a second resource pooling system associated with the second risk-transfer system for the transfer of risk are dynamically determined based on total risk or the likelihood of the occurrence of the predefined risk events of the pooled motor vehicles.

43. The automotive car system according to claim 1, wherein a number of pooled risk exposed motor vehicles is dynamically adapted via the first risk-transfer system by the central, expert-system based circuit to a range where non-covariant occurring risks covered by the first risk-transfer system affect only a relatively small proportion of total pooled risk exposed driving motor vehicles at any given time.

44. The automotive car system according to claim 1, wherein the risk transfer from the first risk-transfer system is dynamically adapted via the second risk-transfer system by the central, expert-system based circuit to a range where non-covariant occurring risks covered by the second risk-transfer system affect only a relatively small proportion of the total risk transferred from the first risk-transfer system at any given time.

45. The automotive car system according to claim 1, wherein the first and second risk transfer parameters and the correlated first and second payment transfer parameters are dynamically adapted the central, expert-system based circuit based on time-correlated incidence data for one or a plurality of risk events.

46. The automotive car system according to claim 1, wherein upon each triggering of an occurrence of captured automotive data or parameters indicating a risk event by the central, expert-system based circuit, a total parametric payment is allocated with the triggering, and the total allocated payment is transferable when the occurrence has been triggered to the corresponding pooled risk exposed driving motor vehicle affected by a measured occurrence of said risk event.

47. The automotive car system according to claim 1, wherein, in the case of triggering an exceedance of a defined activation threshold parameter associated with the occurrence of the defined risk events or as a predefined portion of an occurred loss, the occurred loss is at least partly covered by the second risk-transfer system based on the second risk transfer parameters and correlated second payment transfer parameters.

48. The automotive car system according to claim 1, wherein the automotive car system with the control systems for autonomous motor vehicle driving is a machine-learning based automotive car system.

49. An automotive car system, comprising a plurality of autonomous or partially autonomous driving motor vehicles, including:

exteroceptive sensors or measuring devices configured to sense environmental parameters, the environmental parameters including at least distances to objects, intensity of an ambient light, or sound amplitude;

proprioceptive sensors or measuring devices configured to sense operating parameters of the motor vehicles, the operating parameters including at least a motor speed, wheel load, heading, or battery status of the motor vehicles; and one or more automotive control systems configured to identify appropriate navigation paths, obstacles, or relevant signage by interpreting sensory data of the exteroceptive sensors or measuring devices and the proprioceptive sensors or measuring devices;

one or more first risk-transfer systems configured to provide a first risk-transfer based on first risk transfer parameters from at least some of the motor vehicles to the first risk-transfer system, at least one of the one or more first risk-transfer systems including a plurality of payment transfer modules configured to receive and store first payment associated with risk-transfer of risk exposures of said motor vehicles for pooling of risks of the motor vehicles; and a second risk-transfer system configured-to provide a second risk-transfer based on second risk-transfer parameters from the one or more of the first risk-transfer systems to the second risk-transfer system, the second risk-transfer system including second payment transfer modules configured to receive and store second payment parameters associated with risk exposures transferred to the first risk-transfer systems for pooling of risks of the one or more first risk-transfer systems, wherein the motor vehicles or the automotive control systems are connected to a central, expert-system based circuit through a data link transmitting at least usage-based, user-based, or operational automotive data to the central, expert-system based circuit, the usage-based, user-based, or operational automotive data are based on the sensory data of the exteroceptive and proprioceptive sensors or measuring devices or operating parameters of the automotive control system, risk-related automotive data captured from the motor vehicles are processed by the central, expert-system based circuit, the first risk transfer parameters and correlated first payment transfer parameters being generated by the central, expert-system based circuit and transmitted to the one or more first risk-transfer systems, and, in the case of triggering an occurrence of one of defined risk events associated with transferred risk exposure of the motor vehicles, an occurred loss being automatically covered by the one or more first risk-transfer systems based on the first risk transfer parameters and correlated first payment transfer parameters, the second risk transfer parameters and correlated second payment transfer parameters are generated by the central, expert-system based circuit and transmitted to the second risk-transfer system, the occurred loss being at least partly covered by the second risk-transfer system based on the second risk transfer parameters and correlated second payment transfer parameters, and the first and second risk transfer parameters and the correlated first and second payment transfer parameters are dynamically adapted or optimized by the central, expert-system based circuit based on the usage-based, user-based, or operational automotive data captured from the plurality of autonomous or partially autonomous motor vehicles and based on the pooled risks of the one or more first risk transfer systems.

50. An automotive method for an automotive car system, the method comprising:

sensing environmental parameters by exteroceptive sensors or measuring devices of a plurality of autonomous or partially autonomous driving motor vehicles, the environmental parameters including distances to objects, intensity of an ambient light, or sound amplitude;

sensing operating parameters by proprioceptive sensors or measuring devices of the plurality of autonomous or partially autonomous driving motor vehicles, the operating parameters including a motor speed, wheel load, heading, or battery status of the motor vehicles;

identifying appropriate navigation paths, obstacles, or relevant signage by interpreting sensory data of the exteroceptive and proprioceptive sensors or measuring devices for autonomous or partially autonomous driving of the motor vehicles;

transmitting at least usage-based, user-based, or operational autonomous data via telematics devices to a central, expert-system based circuit, the usage-based, user-based, or operational automotive data being based on the sensory data of the exteroceptive and proprioceptive sensors or measuring devices or operating parameters of an automotive control system;

providing a first risk-transfer by one or more automated first risk-transfer systems based on first risk transfer parameters from at least some of the motor vehicles to the one or more first risk-transfer systems, wherein at least one of the first risk-transfer systems includes a plurality of payment transfer modules configured to receive and store first payment parameters associated with risk-transfer of risk exposures of said motor vehicles for pooling of risks of the motor vehicles;

processing risk-related automotive data captured from the motor vehicles by the central, expert-system based circuit, first risk transfer parameters and correlated first payment transfer parameters being generated by the central, expert-system based circuit and transmitted to the one or more automated first risk-transfer systems, and, in the case of triggering an occurrence of one of defined risk events associated with transferred risk exposure of the motor vehicles, an occurred loss being automatically covered by the one or more first risk-transfer systems based on the first risk transfer parameters and correlated first payment transfer parameters; and providing a second risk-transfer by an automated second risk-transfer system based on second risk-transfer parameters from the one or more of the first risk-transfer systems to the second risk-transfer system, the second risk-transfer system including second payment transfer modules configured to receive and store second payment parameters associated with risk exposures transferred to the one or more first risk-transfer systems for pooling of risks of the one or more first risk-transfer systems;

wherein the second risk transfer parameters and correlated second payment transfer parameters are generated by the central, expert-system based circuit and transmitted to the second risk-transfer system, the occurred loss being at least partly covered by a second insurance system based on the second risk transfer parameters and correlated second payment transfer parameters, and the first and second risk transfer parameters and the correlated first and second payment transfer parameters are dynamically adapted or optimized by the central, expert-system based circuit based on the usage-based, user-based, or operational automotive data captured from the plurality of autonomous or partially autonomous motor vehicles and based on the pooled risks of the one or more first risk transfer systems.

51. A system comprising:
a first risk-transfer system configured to
provide a first risk-transfer based on first risk-transfer parameters from a plurality of motor vehicles to the first risk-transfer system, and
receive and store first payment parameters associated with risk exposures of the plurality of motor vehicles;
a second risk-transfer system configured to
provide a second risk-transfer based on second risk-transfer parameters from the first risk-transfer system to the second risk-transfer system, and
receive and store second payment parameters associated with risk exposures transferred to the first risk-transfer systems; and
an expert-system based circuit configured to
receive environmental parameters and operating parameters from the plurality of motor vehicles, the operating parameters being based on sensory data of exteroceptive sensors of the plurality of motor vehicles, and the environmental parameters being based on sensory data of proprioceptive sensors of the plurality of motor vehicles,
adjust the first risk transfer parameters and correlated first payment transfer parameters, and
adjust the second risk transfer parameters and correlated second payment transfer parameters,
wherein the first and second risk transfer parameters and the correlated first and second payment transfer parameters are dynamically adjusted by the expert-system based circuit based on the environmental parameters or operating parameters received from the plurality of motor vehicles and based on pooled risks of the first risk-transfer system.

* * * * *